United States Patent
Konno et al.

(10) Patent No.: US 7,987,703 B2
(45) Date of Patent: Aug. 2, 2011

(54) TWEEZER-EQUIPPED SCANNING PROBE MICROSCOPE AND TRANSFER METHOD

(75) Inventors: Takashi Konno, Takamatsu (JP); Masatoshi Yasutake, Chiba (JP)

(73) Assignees: AOI Electronics Co., Ltd., Takamatsu-shi (JP); SII Nano Technology Inc., Chiba-shi (JP)

( * ) Notice: Subject to any disclaimer, the term of this patent is extended or adjusted under 35 U.S.C. 154(b) by 692 days.

(21) Appl. No.: 12/130,311

(22) Filed: May 30, 2008

(65) Prior Publication Data

US 2008/0295585 A1    Dec. 4, 2008

(30) Foreign Application Priority Data

Jun. 1, 2007 (JP) .................. 2007-147183

(51) Int. Cl.
*G01B 5/28* (2006.01)
(52) U.S. Cl. ......................................................... 73/105
(58) Field of Classification Search .................. None
See application file for complete search history.

(56) References Cited

U.S. PATENT DOCUMENTS

| 2003/0011389 A1 | 1/2003 | Nakayama et al. |
| 2006/0014196 A1 | 1/2006 | Konno et al. |
| 2008/0149832 A1* | 6/2008 | Zorn ..................... 250/311 |
| 2009/0000362 A1 | 1/2009 | Hashiguchi et al. |
| 2009/0000365 A1 | 1/2009 | Kobayashi et al. |

FOREIGN PATENT DOCUMENTS

| JP | 2000-55643 | * | 2/2000 |
| JP | 2001-252900 A | | 9/2001 |
| JP | 2002-350218 A | | 12/2002 |
| JP | 2006-26826 A | | 2/2006 |
| JP | 2007-93231 A | | 4/2007 |
| JP | 2007-212331 A | | 8/2007 |
| JP | 2007-276072 A | | 10/2007 |
| JP | 2009-2870 A | | 1/2009 |
| WO | WO 2006/054771 A1 | | 5/2006 |

OTHER PUBLICATIONS

Katsuyori Suzuki et al., "The Displacement Measurement Device using a Comb-Drive Actuator", EEJ Trans. SM, vol. 127, No. 3, 2007, pp. 148-152.

* cited by examiner

*Primary Examiner* — Robert R Raevis
(74) *Attorney, Agent, or Firm* — Crowell & Moring LLP

(57) ABSTRACT

A tweezer-equipped scanning probe microscope comprises a first arm with a probing portion, a second arm that moves along an opening direction or a closing direction relative to the first arm, an electrostatic actuator that drives the second arm along the opening direction or the closing direction based upon an opening/closing drive voltage applied thereto, an amplifier that induces self-oscillation in the electrostatic actuator by using an electrically equivalent circuit accompanying the electrostatic actuator as a feedback circuit and causes the second arm to vibrate through the self-oscillation, and a vibration state detection unit that detects a change of vibration state of the second arm as the second arm contacts an object.

12 Claims, 25 Drawing Sheets

DESCENDING

SCANNING

DESCENDING

CLOSING DRIVE

HOLDING

TRANSFER

FIG.15A STEP A 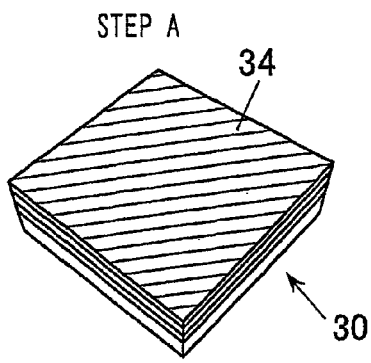
FIG.15B STEP A 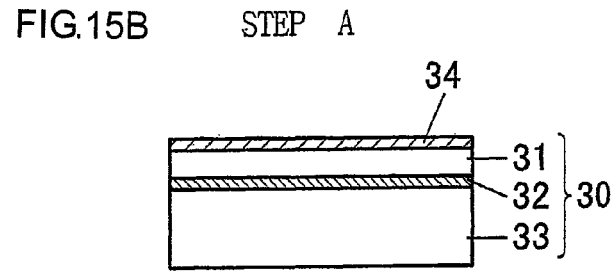
FIG.15C STEP B 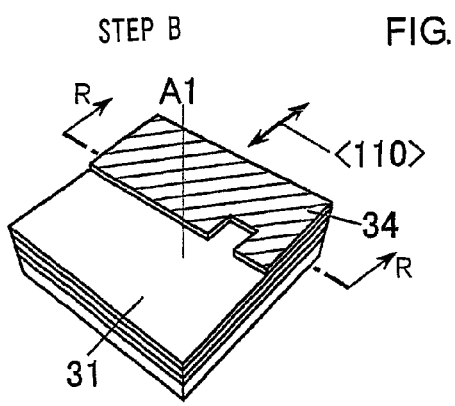
FIG.15D STEP B 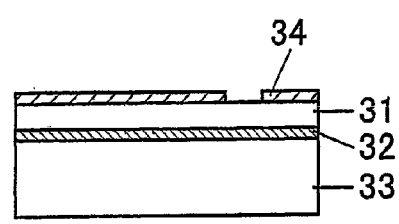
(SECTIONAL VIEW ALONG R - R)
FIG.15E STEP C 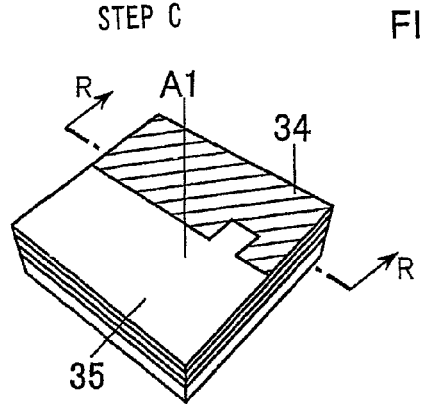
FIG.15F STEP C 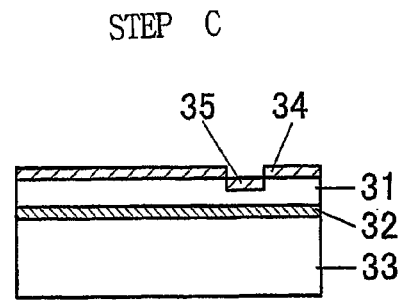
(SECTIONAL VIEW ALONG R - R)

MASK M1

STEP D

STEP D

STEP E

STEP E

STEP E

MASK M2

STEP F

STEP F

STEP G

STEP G

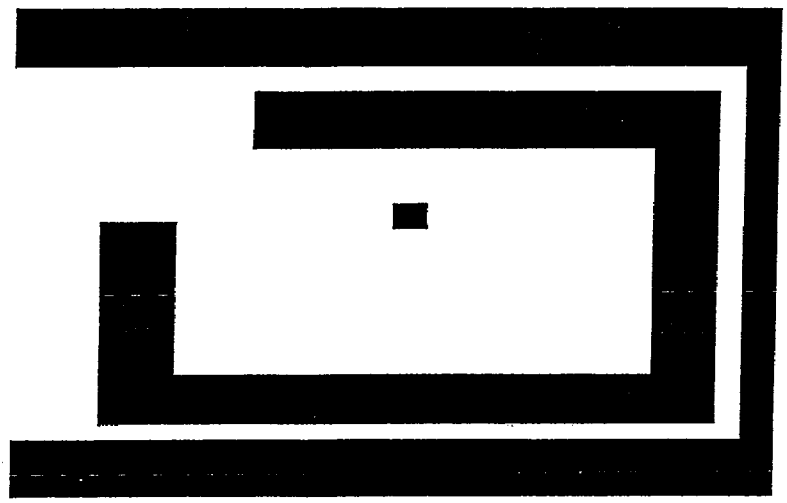
FIG.20B  MASK M4
FIG.20A  MASK M3

TWEEZER-EQUIPPED SCANNING PROBE MICROSCOPE AND TRANSFER METHOD

INCORPORATION BY REFERENCE

The disclosure of the following priority application is herein incorporated by reference: Japanese Patent Application No. 2007-147183 filed Jun. 1, 2007

BACKGROUND OF THE INVENTION

1. Field of the Invention

The present invention relates to a tweezer-equipped scanning probe microscope and a specimen transfer method to be adopted in the tweezer-equipped scanning probe microscope.

2. Description of Related Art

There is a scanning probe microscope (SPM) known in the related art which includes a cantilever having both an observation function and a holding function (see Japanese Patent Application Publication No. 2001-252900). Through this scanning probe microscope, an extremely small object can be observed by using as a probe one of two carbon nanotubes fixed to the front end of the cantilever. The two carbon nanotubes are also used to hold an object as their front end portions are, for instance, electrostatically caused to move apart to open or to move together to close onto an object. There is also a scanning probe microscope known in the related art, which includes an electrostatic actuator utilized as a detector (see Japanese Patent Application Publication No. 2007-93231 and Non-Patent Document: Kazuyori Suzuki, Kenjiro Ayano, Gen Hashiguchi, "The Displacement Measurement Device Using a Comb-Drive Actuator", IEEJ Trans. SM. Vol. 127, No. 3, pp. 148-152, 2007).

There is an issue yet to be addressed in the scanning probe microscope equipped with carbon nanotubes in that since contact with the specimen or a hold on the specimen cannot be detected, the state of contact with the specimen or a hold on the specimen cannot easily be verified. There are also issues yet to be effectively addressed in the scanning probe microscope equipped with an electrostatic actuator in that the probe with a probing needle formed thereat cannot be made to resonate with a high level of sensitivity with a uniform, very small amplitude and in that since the detection system is bound to assume a complex structure, it cannot be readily adopted in practical use as the Z control detector of the scanning probe microscope.

SUMMARY OF THE INVENTION

According to a first aspect of the present invention, a tweezer-equipped scanning probe microscope comprises a first arm with a probing portion, a second arm that moves along an opening direction or a closing direction relative to the first arm, an electrostatic actuator that drives the second arm along the opening direction or the closing direction based upon an opening/closing drive voltage applied thereto, an amplifier that induces self-oscillation in the electrostatic actuator by using an electrically equivalent circuit accompanying the electrostatic actuator as a feedback circuit and causes the second arm to vibrate through the self-oscillation, and a vibration state detection unit that detects a change of vibration state of the second arm as the second arm contacts an object.

According to a second aspect of the present invention, the tweezer-equipped scanning probe microscope of the first aspect may further comprise a gain adjustment unit that adjusts a gain at the amplifier so as to sustain a vibration amplitude at the second arm caused to vibrate through the self-oscillation at a constant level in a non-contact state.

According to a third aspect of the present invention, the tweezer-equipped scanning probe microscope of the first aspect may further comprise a hold detection unit that detects a hold on a specimen by the first arm and the second arm based upon the change of vibration state detected by the vibration state detection unit.

According to a fourth aspect of the present invention, in the tweezer-equipped scanning probe microscope of the first aspect, the vibration state detection unit can detect the change of vibration state by detecting at least one of; a change in amplitude of resonance, a change in frequency or a change in phase, which occur as the second arm contacts the object.

According to a fifth aspect of the present invention, in the tweezer-equipped scanning probe microscope of the first aspect, it is desirable that the electrostatic actuator includes a stationary comb electrode unit and a movable comb electrode unit that is linked to the second arm and drives the second arm.

According to a sixth aspect of the present invention, the tweezer-equipped scanning probe microscope of the first aspect may further comprise a scanning unit that scans the probing portion over an observation target, a detection unit that detects a change of vibration state of the first arm related to an interaction between the probing portion and the observation target, and a Z servo system that controls a distance between the probing portion and a specimen so as to sustain an extent of the change of vibration state at a constant level. In this tweezer-equipped scanning probe microscope, it is preferable that a contour and a position of the observation target are measured based upon the distance between the probing portion and the observation target.

According to a seventh aspect of the present invention, it is desirable that the tweezer-equipped scanning probe microscope of the sixth aspect further comprises an exciting unit that causes the first arm to vibrate with flexural elasticity toward the observation target through natural vibration thereof.

According to an eighth aspect of the present invention, a tweezer-equipped scanning probe microscope comprises a first arm, a second arm with a probing portion that moves along an opening direction or a closing direction relative to the first arm, an electrostatic actuator that drives the second arm along the opening direction or the closing direction based upon an opening/closing drive voltage applied thereto, an amplifier that induces self-oscillation in the electrostatic actuator by using an electrically equivalent circuit accompanying the electrostatic actuator as a feedback circuit and causes the second arm to vibrate through the self-oscillation, a gain adjustment unit that adjusts a gain at the amplifier when the electrostatic actuator is self-oscillating, a vibration state detection unit that detects a change of vibration state of the second arm as the second arm contacts an object, and a scanning unit that scans the probing portion over an observation target. In this tweezer-equipped scanning probe microscope, it is preferable that the second arm vibrating through the self-oscillation is moved in close proximity to the observation target and contour information indicating a contour of a surface of the observation target is obtained by the scanning unit while operating a Z servo system that controls a distance between the probing portion and a specimen so as to sustain an extent of the change of vibration state of the second arm related to interaction between the probing portion and the observation target at a constant level.

According to a ninth aspect of the present invention, the tweezer-equipped scanning probe microscope of the eighth aspect may further comprise a hold detection unit that detects a hold on a specimen by the first arm and the second arm based upon the change of vibration state detected by the vibration state detection unit.

According to a tenth aspect of the present invention, in the tweezer-equipped scanning probe microscope of the eighth aspect, the vibration state detection unit can detect the change of vibration state by detecting at least one of; a change in amplitude of resonance, a change in frequency or a change in phase, which occur as the second arm contacts the object.

According to an eleventh aspect of the present invention, a specimen transfer method adopted in a tweezer-equipped scanning probe microscope of the sixth aspect comprises determining a position of the specimen by scanning the specimen with the probing portion, moving the first arm and the second arm to positions at which the specimen is set between the first arm and the second arm based upon the position of the specimen having been determined, closing the second arm so as to hold the specimen between the first arm and the second arm, and transferring the specimen by moving the first arm and the second arm holding the specimen therebetween.

According to a twelfth aspect of the present invention, a specimen transfer method adopted in a tweezer-equipped scanning probe microscope of the eighth aspect comprises determining a position of the specimen by scanning the specimen with the probing portion, moving the first arm and the second arm to positions at which the specimen is set between the first arm and the second arm based upon the position of the specimen having been determined, closing the second arm so as to hold the specimen between the first arm and the second arm, and transferring the specimen by moving the first arm and the second arm holding the specimen therebetween.

BRIEF DESCRIPTION OF THE DRAWINGS

FIGS. 15A and 15B illustrate step a, FIGS. 15C and 15D illustrate step b and FIGS. 15E and 15F illustrate step c;

FIG. 20A shows the mask M3 and FIG. 20B shows the mask M4;

DETAILED DESCRIPTION OF PREFERRED EMBODIMENTS

The following is an explanation of preferred embodiments of the present invention given in reference to the drawings.

First Embodiment

Figure 1:
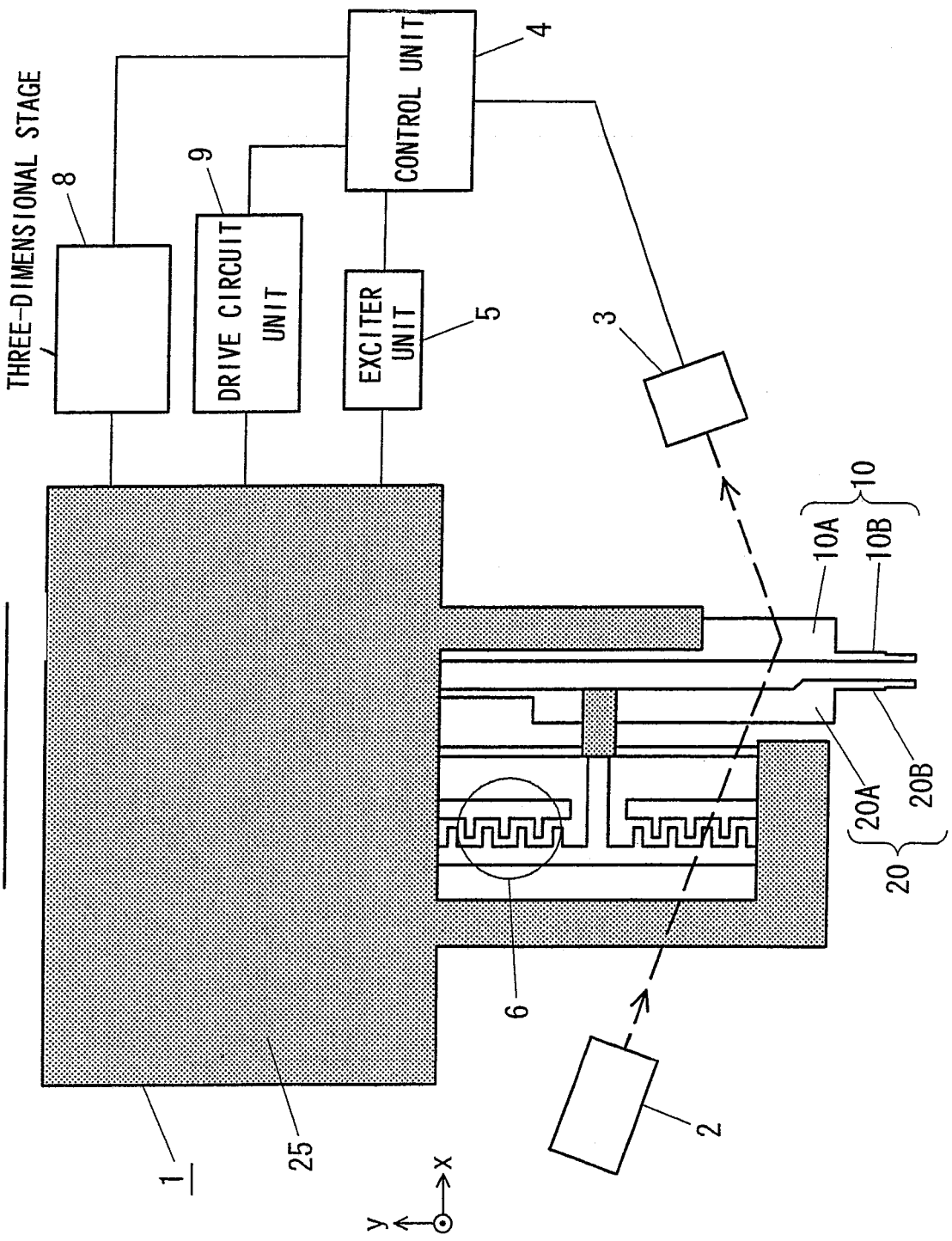
FIG. 1 shows a first embodiment of the tweezer-equipped scanning probe microscope according to the present invention.

FIG. 1 shows the tweezer-equipped scanning probe microscope (SPM) according to the present invention as achieved in an embodiment. The figure schematically illustrates the structure adopted in an atomic force microscope device (hereinafter referred to as an AFM device) similar to those in the related art, which includes a first arm constituting an optical lever used to observe the shape of the specimen.

The AFM device 100 includes comb drive-type AFM tweezers 1, a laser light source 2, a photodiode 3, a control unit 4, an exciter unit 5, an electrostatic actuator 6, a three-dimensional stage 8 and a drive circuit unit 9. It is to be noted that the photodiode 3 should be constituted with a double-split photodiode or a quarter-split photodiode. The AFM tweezers 1 include a fixed arm 10 and a movable arm 20, which are formed as integrated parts of a support member 25, and are formed by processing an SOI wafer through photolithography, as explained later.

The fixed arm 10 includes a lever 10A and a probing portion 10B formed at the front end of the lever 10A. The fixed arm 10 is used as an observation probe during AFM observation performed by utilizing the AFM tweezers 1. The movable arm 20 includes a lever 20A and a holding portion 20B formed at the front end of the lever 20A. The probing portion 10B and the holding portion 20B disposed substantially parallel to each other are set apart from each other over a predetermined distance. The movable arm 20 is driven along the opening/closing direction via the comb-type electrostatic actuator 6.

The support member 25 is detachably held at a holder (not shown) disposed at the AFM device 100. The holder, which holds the support member 25, is fixed to the three-dimensional stage 8 disposed at the AFM device 100. The entire AFM tweezers 1 can be displaced along an x-direction, a y-direction and a z-direction by individually driving the three-dimensional stage 8. It is to be noted that the support member 25 may be attached to the holder through any of various methods, e.g., by sliding the support member 25 into a groove or a recess formed in the holder so that the support member is fitted in the groove or the recess or by clamping the support member 25 via a plate spring mounted at the holder.

While a scanning operation is executed by three-dimensionally displacing the tweezer side in the example described above, the three-dimensional stage 8 may be disposed on the specimen side. As a further alternative, the AFM tweezers 1 may be mounted on a Z stage (actuator) and an XY stage (actuator) may be disposed on the specimen side. In either case, the Z servo system will be engaged in operation based upon detection results provided by the optical lever system.

Laser light originating from the laser light source 2 is radiated onto the upper surface of the fixed arm 10 and laser light reflected off the upper surface is detected via the photodiode 3. The detection signal provided from the double-split or quarter-split photodiode 3 is input to the control unit 4, which controls the entire device. Based upon the detection signal, the control unit 4 calculates changes occurring with regard to the state of vibration of the fixed arm 10 (changes in the amplitude, the frequency, the phase and the like) and determines through arithmetic operation the contour of the specimen surface. The results obtained through the arithmetic operation are displayed at a monitor (not shown) or the like. Although not shown, a piezoelectric element that excites the fixed arm 10 by vibrating the entire AFM tweezers 1 along the z direction and a drive unit that drives the piezoelectric element are disposed at the exciter unit 5.

Figure 2:
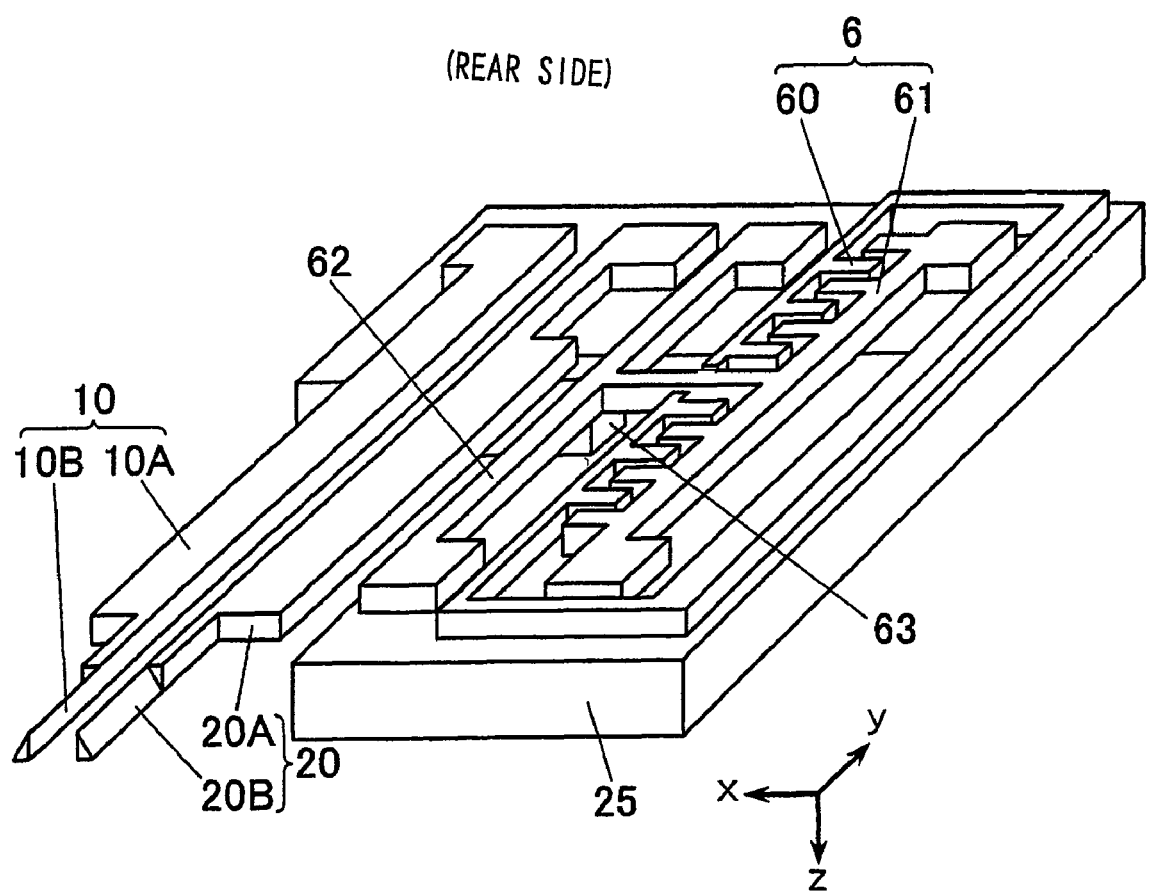
FIG. 2 schematically illustrates the structure of the AFM tweezers 1.

FIG. 2 schematically illustrates the structure of the AFM tweezers 1 in a prospective viewing the AFM tweezers 1 from the rear surface side (along the –z direction). The electrostatic actuator 6 includes a comb-type fixed electrode 60 fixed to the support member 25 and a comb-type movable electrode 61 linked to the movable arm 20. A DC voltage for opening/closing the arm is applied from the drive circuit unit 9 to the area between the fixed electrode 60 and the movable electrode 61.

The movable electrode 61 is supported on the support member 25 via an elastic support portion 62. The elastic support portion 62 is linked to the movable arm 20 via a linking member 63. Thus, as the movable electrode 61 is driven along the x direction by controlling the arm opening/closing voltage, the movable arm 20 is driven along the closing direction so as to close the AFM tweezers 1. As a result, a specimen can be held between the probing portion 10B and the holding portion 20B.

The AFM tweezers 1 have a tweezing function whereby they are engaged to transfer the specimen held between the probing portion 10B and the holding portion 20B and an observation probe function whereby they are engaged in AFM observation of the specimen. The probing portion 10B and the holding portion 20B are designed so that their lengths taken along the y direction, widths taken along the x direction and heights taken along the z direction are all equal to each other and they both assume a wedge shape, tapering off along the –z direction.

The probing portion 10B and the holding portion 20B both have a right triangle section, with a pointed end set on the plane of the rear surface of the tweezers. The specimen can be held with these between holding surfaces of the probing portion 103 and the holding portion 20B facing opposite each other and ranging vertically parallel to each other. In addition, the probing portion 10B with a pointed front end facilitates the AFM observation.

(Observation Operation)

First, an observation operation executed by utilizing the AFM tweezers 1 is explained. The piezoelectric element disposed at the exciter unit 5 is driven to vibrate the entire AFM tweezers along the z direction for the AFM observation.

Figure 3:
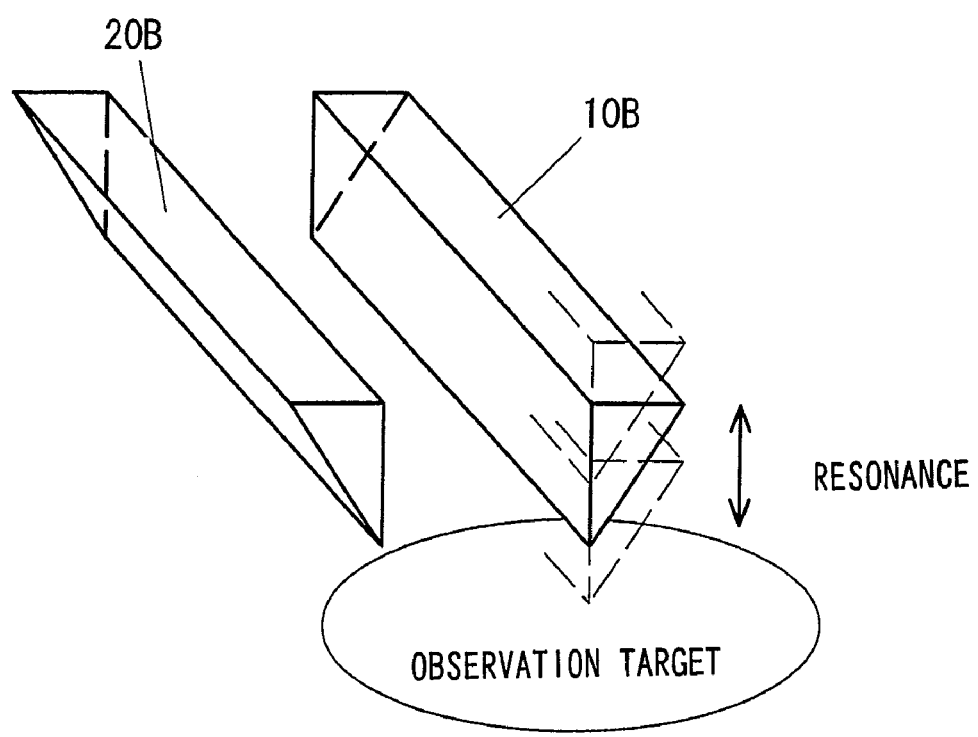
FIG. 3 shows the probing portion 10B and the holding portion 20B in an enlargement.

FIG. 3 shows the probing portion 10B and the holding portion 20B in an enlargement. When vibrating the entire AFM tweezers 1 along the z direction via the exciter unit 5, the oscillation frequency is set to a resonance frequency equivalent to the inherent vibration frequency of the fixed arm 10. By setting the resonance frequency of the fixed arm 10 to a value larger than that of the resonance frequency of the movable arm 20, as shown in FIG. 4, the fixed arm 10 alone can be made to resonate to a great extent along the z direction.

Figure 4:
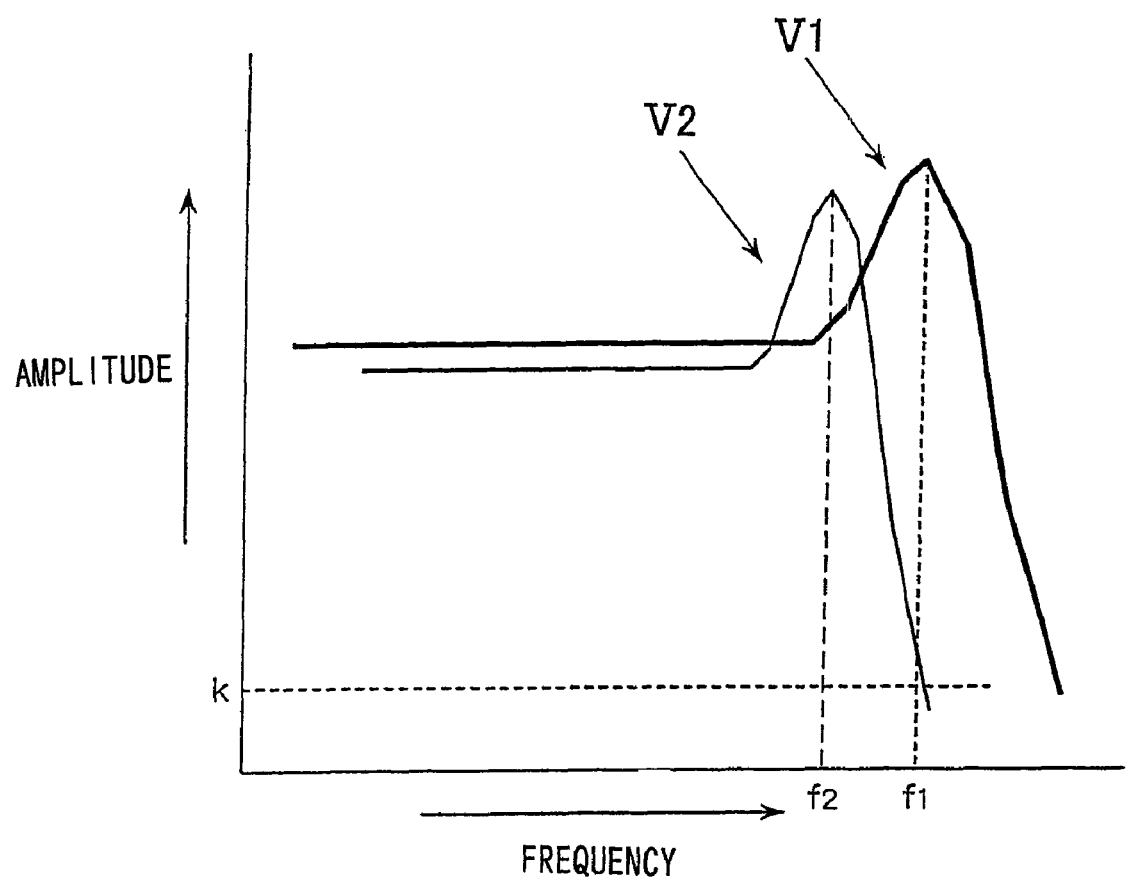
FIG. 4 shows the resonance frequency of the fixed arm 10.

In the chart of the resonance frequency of the fixed arm 10 provided in FIG. 4, the amplitude is indicated along the vertical axis and the frequency is indicated along the horizontal axis. V1 and V2 in FIG. 4 are respectively the vibration curve of the fixed arm 10 and the vibration curve of the movable arm 20. When the oscillation frequency of vibration induced via the exciter unit 5 is f1, the fixed arm 10 resonates and an amplitude peak manifests. This frequency f1 is equivalent to the resonance frequency of the fixed arm 10.

The resonance frequency of the movable arm 20 is f2 and an amplitude peak manifests at the frequency f2. Once the frequency exceeds f2, the amplitude decreases drastically and thus, an amplitude k of the movable arm 20 at the frequency f1 assumes a much smaller value than the amplitude of the fixed arm 10. By designing levers 10A and 20A so as to set the resonance frequency f1 of the fixed arm 10 higher than the resonance frequency f2 of the movable arm 20 as described above, the fixed arm 10 alone can be made to vibrate to a great extent.

FIG. 3 shows the fixed arm 10 vibrating to a great extent at the resonance frequency f1, with the holding portion 20B assuming a much smaller amplitude than the amplitude of the probing portion 10B. In the AFM observation, the contour of the observation target is measured by scanning the AFM tweezers 1 along the XY direction while exciting the probing portion 10B as shown in FIG. 3. This method of measurement is generally referred to as a dynamic force mode. During the AFM observation, the probing portion 10B of the fixed arm 10 is set in very close proximity to the specimen surface over a distance of the atomic order. Then, the entire observation target is scanned by causing the probing portion to vibrate up/down.

As the distance between the front end of the probing portion 10B and the observation target (i.e., the average distance between the front end of the probing portion 10B and the observation target since the probing portion 10B is vibrating) changes due to irregularities at the specimen surface, the amplitude of the lever 10A also changes due to changes in the interaction between the observation target surface and the probing portion 10B. The extent to which the amplitude changes as described above is measured through an optical lever measurement executed by utilizing the laser light source 2 and the photodiode (a double-split or quarter-split photodiode) 3.

In the optical lever measurement, laser light originating from the laser light source 2 is directed onto the upper surface of the lever 10A and the light reflected off the upper surface of the lever 10 is received at the photodiode 3 functioning as a light-receiving portion, as shown in FIG. 1. The photodiode 3 outputs a detection signal corresponding to the position at which the light has been received to the control unit 4. Based upon the detection signal provided from the photodiode 3 constituted with a double-split photodiode or a quarter-split photodiode, the control unit 4 calculates the extent to which the state of vibration of the lever 10A has changed and then ascertains the surface contour (obtains an image of the surface with indentations and projections) by scanning the specimen surface, i.e., the observation target, along the XY direction while engaging in operation the Z servo system, which controls the distance between the probe and the specimen so as to achieve uniformity in the extent of change in the vibrating state. The surface contour is then displayed at a monitor (not shown) or the like.

(Holding Operation)

Next, the holding operation is described. An opening/closing operation for the movable arm 20 is executed by controlling the value of the DC arm opening/closing voltage applied as described earlier in the AFM tweezers 1 in the embodiment. In addition, the electrostatic actuator 6 is caused to excite itself to vibrate so as to induce slight vibration of the movable arm 20 and a hold on the specimen by the AFM tweezers 1 is detected based upon a change occurring in the state of the slight vibration as the specimen becomes held.

An explanation is now given on the oscillator function of the electrostatic actuator 6 whereby the electrostatic actuator 6, with the electrical system and the mechanical system coupled via the arm opening/closing voltage is caused to oscillate at a predetermined frequency as an AC voltage is applied.

Figure 5:
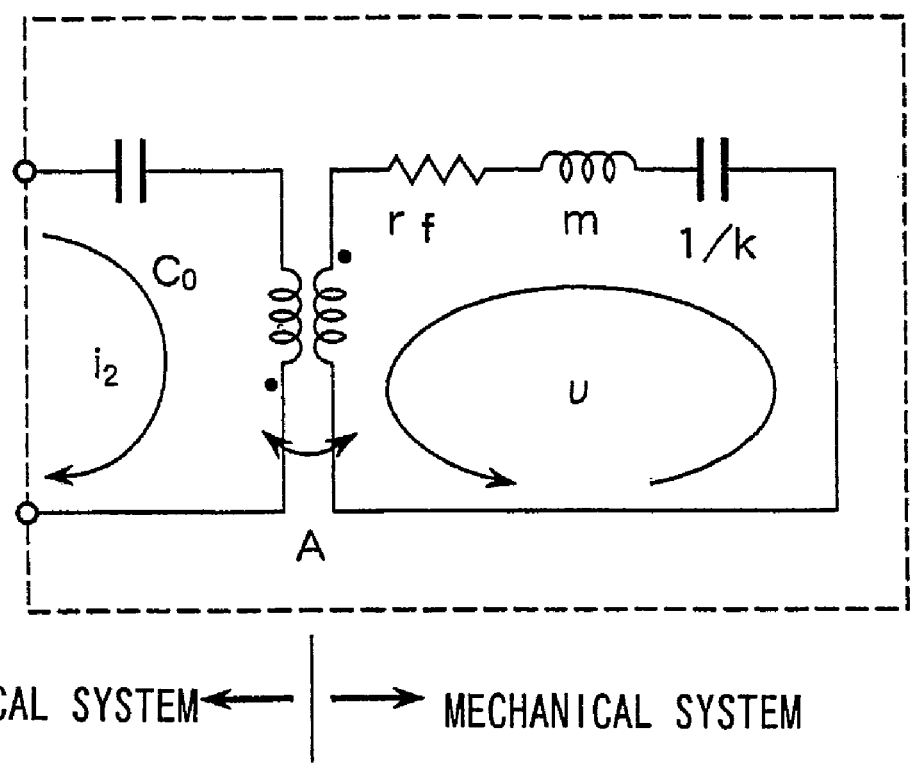
FIG. 5 shows an equivalent circuit for the electromechanical-coupled system in the electrostatic actuator 6.

FIG. 5 shows an equivalent circuit of the electromechanical-coupled system in the electrostatic actuator 6. Generally speaking, the principal of energy conservation applies both with regard to the electrical energy and with respect to the mechanical energy in an electromechanical-coupled system. Accordingly, an electromechanical-coupled system modeled with a small arm opening/closing voltage, in which the movable electrode 61 is displaced to a small extent and the quantity of electrical charge fluctuates to a small extent, is examined.

Portions of the fixed electrode 60 and the movable electrode 61 face opposite each other, with each assuming a comb shape having a plurality of teeth constituted with a plurality of indentations and projections. The electrodes 60 and 61 are disposed so that a projection at one electrode is set inside an indentation at the other electrode. An electrostatic capacitance $C_0$ manifesting between the electrodes indicates the total electrostatic capacitance representing the sum of the capacities manifesting between the individual indentations/projections. In addition, m indicates the mass of the movable portions (the movable arm 20 and the movable electrode 61), k indicates the spring constant, $r_f$ indicates the mechanical resistance and v indicates the vibration velocity of the movable portions. A is a coupling coefficient with regard to the coupling of the mechanical system and the electrical system achieved as the arm opening/closing voltage $E_0$ is applied. As an AC voltage is applied in order to induce vibration, the current $i_2$ flows to the electrical system and thus, the electrostatic actuator 6 is driven.

Linearly approximated basic equations with regard to the electrostatic actuator 6 represented by the equivalent circuit in FIG. 5 may be written as in (1) and (2) below. It is to be noted that $C_S$ indicates the floating capacity and the equations are written by substituting $C_0+C_S$ for $C_0$ in the equivalent circuit in FIG. 5.

$$i_1 = j\omega(C_0+C_S)e_1 + (E_0C_0/X_0)v_1 \quad (1)$$

$$f_1 = j\omega m v_1 + r_f v_1 + kv_1/j\omega + E_0C_0e_1/X_0 \quad (2)$$

In the equations, $i_1$ indicates the AC current value, $e_1$ indicates the amplitude of the input AC voltage, $v_1$ indicates the vibration velocity of the movable portions and $f_1$ indicates the external force applied to the movable portions. In addition, $X_0$ indicates the distance between the teeth of the comb in an initial state.

Based upon expressions (1) and (2), the relationship between the absolute value $|Y|$ of the admittance at the electrostatic actuator 6 and the angular frequency $\omega$ when no external force is applied may be written as in (3) below. It is assumed that $$A = E_0C_0/X_0. \quad (3)$$

Figure 6:
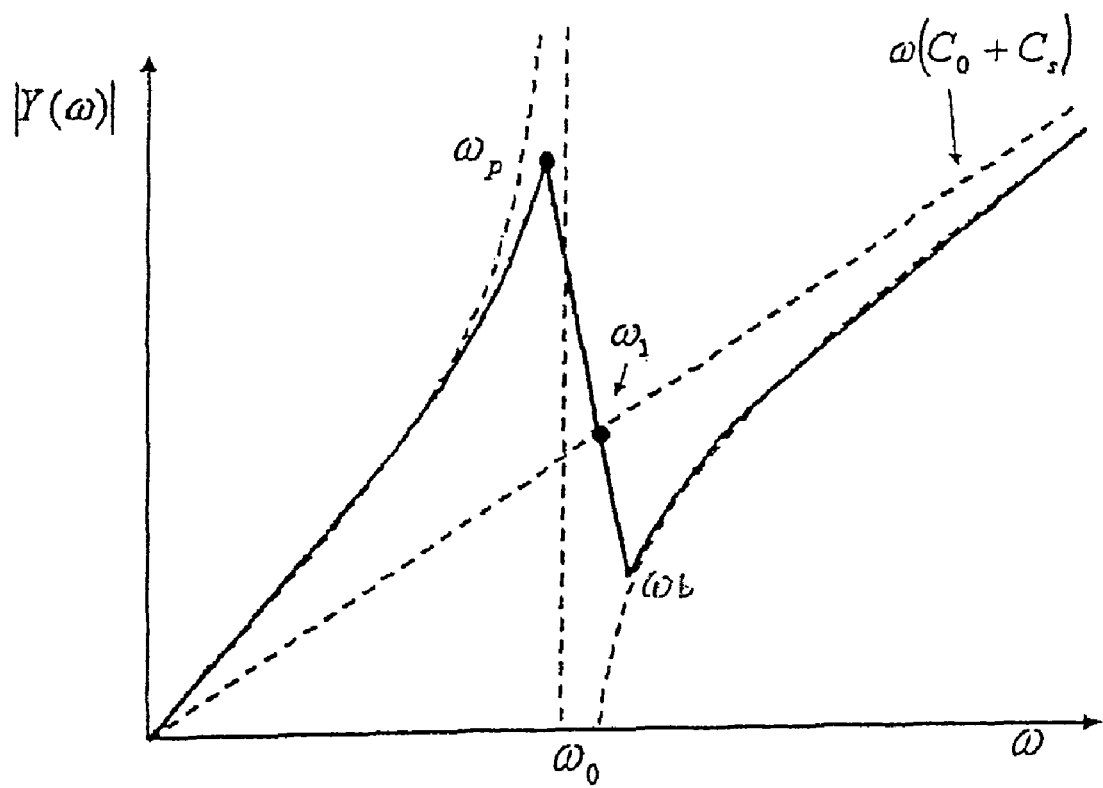
FIG. 6 shows an admittance curve representing the angular frequency dependency of the admittance value |Y|.

FIG. 6 shows the admittance curve indicating the angular frequency dependency of the admittance value $|Y|$. This admittance curve constitutes a characteristics curve indicating the characteristics of the electromechanical-coupled system. The straight line (dotted line) written as $|Y|=\omega(C_0+C_S)$, on the other hand, represents the characteristics of the electrical system, i.e., the electrical system not coupled with the mechanical system. Namely, this particular characteristics curve is achieved when the relationship expressed in (4) below is true in expression (3).

$$A_2 - 2\omega(C_0+C_S)(\omega m - k/\omega) = 0 \quad (4)$$

Assuming that the angular frequency $\omega$ which satisfies the relationship in expression (4) is designated as an oscillation angular frequency $\omega_1$, the oscillation angular frequency $\omega_1$ matches the angular frequency assumed at the point at which the admittance curve and the straight line expressed as $|Y|=\omega(C_0+C_S)$ intersect each other. The oscillation frequency $\omega_1$ assumes a value close to the value of the resonance angular frequency $\omega_0$, and as the electrostatic actuator 6 is driven at the oscillation angular frequency $\omega_1$, the characteristics of the mechanical system are cancelled as described above, thereby enabling the measurement of the admittance of the electrical system alone.

It is to be noted that with respect to the resonance angular frequency $\omega_0$, the peak angular frequency in the admittance curve is set at a position slightly higher than $\omega_p$. Accordingly, assuming that $\omega_p$ represents the peak angular frequency in the admittance curve and that $\omega_b$ represents the angular frequency over the bottom part of the recessed curve, the relationship between the resonance angular frequency $\omega_0$ and the oscillation angular frequency $\omega_1$ can be expressed as in (5) below.

(5)

The logic described above reveals that the electrostatic actuator 6 functions as a resonant circuit. Accordingly, a self-oscillation drive mechanism is constituted by using the electrostatic actuator 6 and an amplifier in the embodiment.

Figure 7:
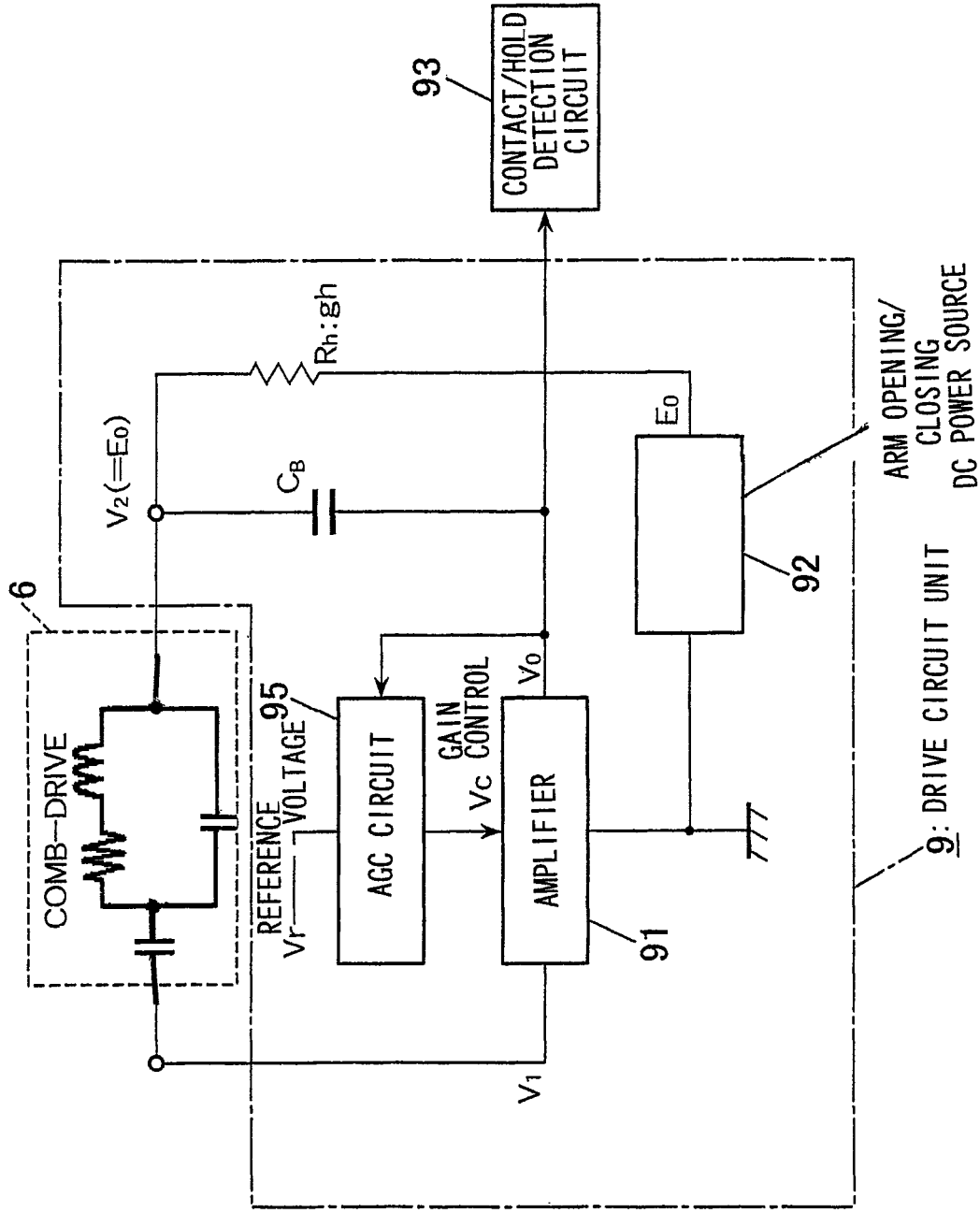
FIG. 7 is a block diagram illustrating the structure of the drive circuit unit 9.

FIG. 7 is a block diagram of the drive circuit unit 9 that drives the electrostatic actuator 6. The electrostatic actuator 6 is shown in the figure as an L, C, R resonant circuit-based unit constituted with an L, C, R resonant circuit with which a comb drive comes equipped. Namely, FIG. 7 illustrates the drive circuit 9 by assuming that the comb drive is a passive two-terminal element.

The drive circuit unit 9 includes an amplifier 91 with the comb drive (electrostatic actuator) 6 functioning as its feedback circuit, an AGC (auto-gain control) circuit 95 that generates a gain control voltage $V_c$ by comparing a voltage $V_0$ output from the amplifier 91 with a reference voltage $V_r$, and a DC power source 92 that applies a bias DC voltage $E_0$ to the comb drive (electrostatic actuator) 6. In relation to the function of the electrostatic actuator, the bias application DC power source 92 may be referred to as an "arm opening/closing DC power source".

In the embodiment the comb drive (electrostatic actuator) 6 is inserted at the feedback circuit of the amplifier 91 by satisfying the following requirements.

Firstly, since the internal resistance at the DC power source 92 from which the bias DC voltage $E_0$ is applied is extremely small, it is necessary to ensure that the feedback signal does not pass through the path toward the DC power source 92. Accordingly, a high resistance resistor $R_{high}$ is inserted in series with the DC power source so as to prevent the bias DC power source 92 from affecting the feedback path.

Secondly, the bias application DC power source 92 is made to function as a DC circuit floating off the circuit system which includes the amplifier 91 and also a blocking capacitor $C_B$ is inserted so as to ensure that the DC voltage is not directly applied to the terminals (an output terminal and an input terminal) of the amplifier 91.

Next, the voltages $V_1$ and $V_2$ at the terminals of the comb drive (electrostatic actuator) 6 are explained. The voltage $V_1$, assuming a value ascertained based upon the design value for the DC bias circuit in the amplifier 91, is normally set so that $V_1 = +B/2$ if only a unisign source voltage (+B) is used. However, if the source voltage assumes both signs (±B), $V_1$ is set to 0.

The voltage $V_2$, which does not allow the DC current to pass through as the equivalent circuit of the comb drive (electrostatic actuator) 6 clearly indicates, is set equal to $E_0$. $E_0$ is the bias DC voltage applied to the comb drive (electrostatic actuator) 6. The comb drive (electrostatic actuator) 6 is made to open/close based upon the difference between the voltage $V_1$ and the voltage $V_2$ set as described above. In other words, the difference between the potentials at the terminals required to open/close the comb drive (electrostatic actuator) 6 is $|V_1 - V_2|$.

The arm opening/closing voltage $E_0$ is applied from the arm opening/closing DC power source 92 to the electrodes 60 and 61 at the electrostatic actuator 6. The opening/closing operation of the movable arm 20 is executed by controlling the arm opening/closing voltage $E_0$. An output signal originating from the amplifier 91 is provided to a contact/hold detection circuit 93. The contact/hold detection circuit 93 includes a built-in voltage comparator or a built-in frequency comparator (neither shown) that enables it to detect the state of contact with the specimen or the state of hold on the specimen. Namely, as the voltage value output from the amplifier 91 is monitored via the voltage comparator, contact with/hold on the specimen is detected. In conjunction with a frequency comparator, contact with/hold on the specimen is detected by monitoring the frequency of the signal output from the amplifier 91.

By constituting an oscillation circuit with the amplifier 91 and the comb drive (electrostatic actuator) 6, it is ensured that the movable arm 20 is caused to vibrate at the resonance frequency in response to application of a voltage to the electrostatic actuator 6. As the vibrating movable arm 20 comes into contact with the specimen or another object, the R, the C and the L in the equivalent circuit change, which, in turn, alters the amplitude and frequency of the vibration. In the embodiment, the changes in the amplitude and frequency are detected via the contact/hold detection circuit 93 in order to detect a hold of the movable arm 20 on the specimen by the movable arm 20 or contact with a substrate surface or the like on which the specimen is placed.

However, it has been learned that as the movable arm 20 is operated to open or close by altering the arm opening/closing voltage, the amplitude and frequency of the vibration are affected by the level of the arm opening/closing voltage, i.e., in correspondence to the degree to which the movable arm 20 is made to open. In addition, the amplitude of the movable arm 20 must be reduced to approximately 100 nm in order to assure a satisfactory level of contact detection accuracy. However, when the amplitude is very small, the viscosity of the air and the like may destabilize the vibration, leading to a concern that a smaller amplitude accompanied by a destabilized vibration may result in a false hold detection. Furthermore, the operation may be destabilized by electrical noise originating from an external source.

Accordingly, the AGC circuit 95 is utilized to adjust the gain of the amplifier 91 go as to sustain the output voltage $V_0$ from the amplifier 91 at a constant level even if the input $V_1$ fluctuates as the arm opens/closes. This means that when the AFM tweezers 1 are in a free state, i.e., when the tweezers are not holding any object, the movable arm 20 vibrates with a uniform amplitude. However, an optimal value should be set in advance with regard to the gain control function of the AGC circuit 95, in order to ensure that the contact/hold detection circuit 93 is able to detect the state of contact or hold as described above. Since the gain setting is a design matter, it is not described in detail.

FIG. 7 shows the amplifier 91 constituted with a voltage-controlled variable gain amplifier and the AGC circuit 95 constituted with an output level detector (not shown), an error detection circuit (not shown) and a control circuit (not shown). Namely, the output voltage $V_0$ from the amplifier 91 is monitored via the output level detector (not shown) and the error detection circuit (not shown) is engaged in operation to compare the DC voltage output from the output level detector (not shown) with the reference voltage $V_r$ set in advance. The error detection circuit (not shown) then outputs an error signal k indicating the comparison results to the control circuit (not shown). The control circuit (not shown), in turn, supplies to the control terminal of the amplifier 91 a gain control voltage $V_c$ at which the error signal k (not shown) takes the value 0. The amplifier 91 amplifies the input voltage $V_1$ with the gain corresponding to the gain control voltage $V_c$ input thereto and then outputs the output voltage $V_0$. In the embodiment, the output voltage $V_0$ is controlled to sustain a constant level by executing control under which the gain control voltage $V_c$ increases and the gain at the amplifier 91 is thus reduced as the output voltage $V_0$ increases.

Figure 8:
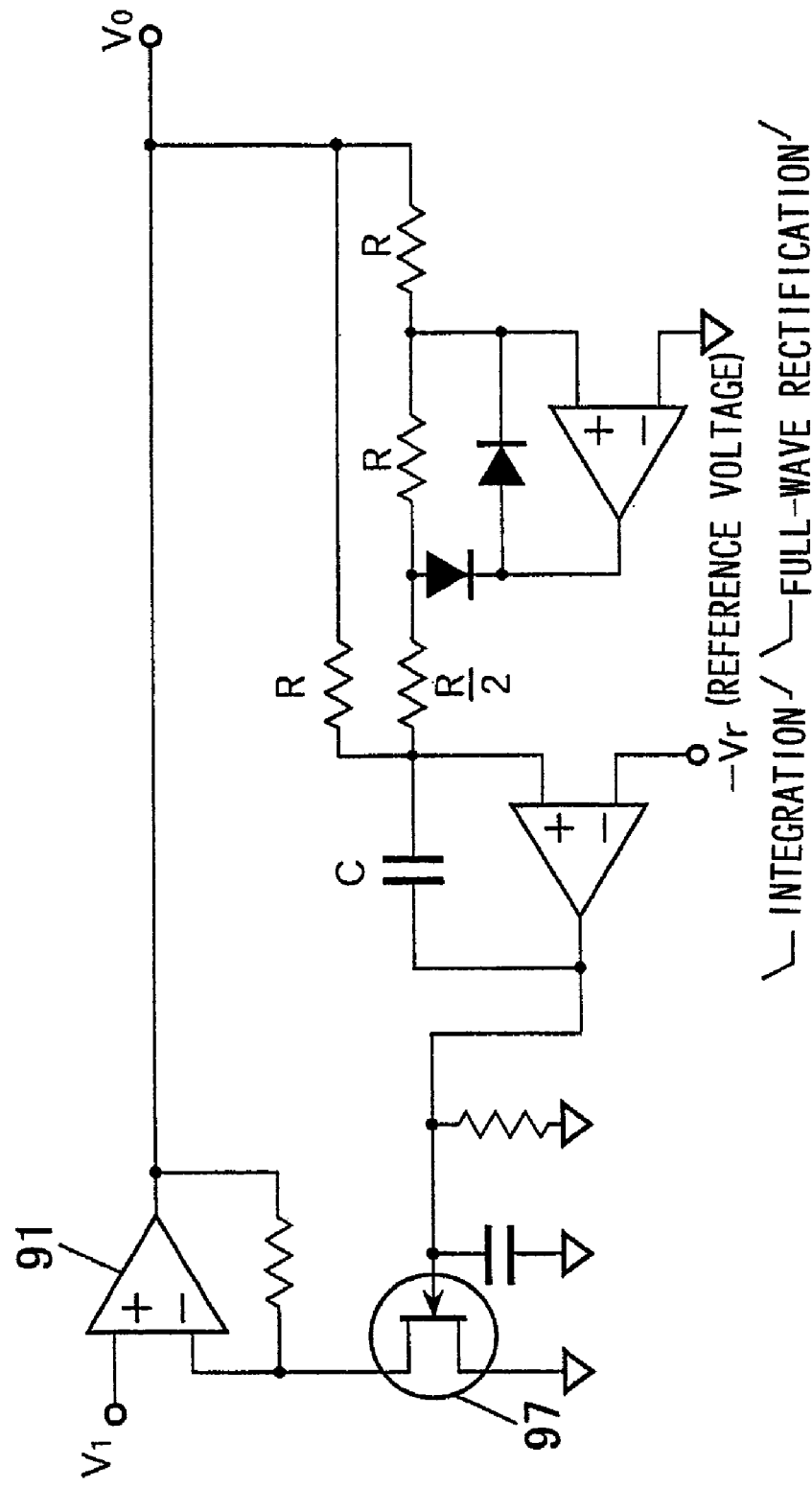
FIG. 8 presents an example of the AGC circuit 95.

FIG. 8 presents an example of the AGC circuit 95. The output voltage $V_0$ from the amplifier 91 undergoes full-wave rectification and the gain control voltage $V_c$, reflecting the results of comparison of the voltage having undergone the full-wave rectification with the reference voltage $-V_r$, is output from an operational amplifier disposed at a stage further rearward. The gain control voltage $V_c$ is input to a gate of an FET 97 and as the gate voltage is altered, the gain of the amplifier 91 is adjusted. Since the gain control voltage $V_c$ is controlled so as to allow the error signal k to assume the value of 0, the output voltage $V_0$ with a uniform amplitude is obtained.

Figure 9:
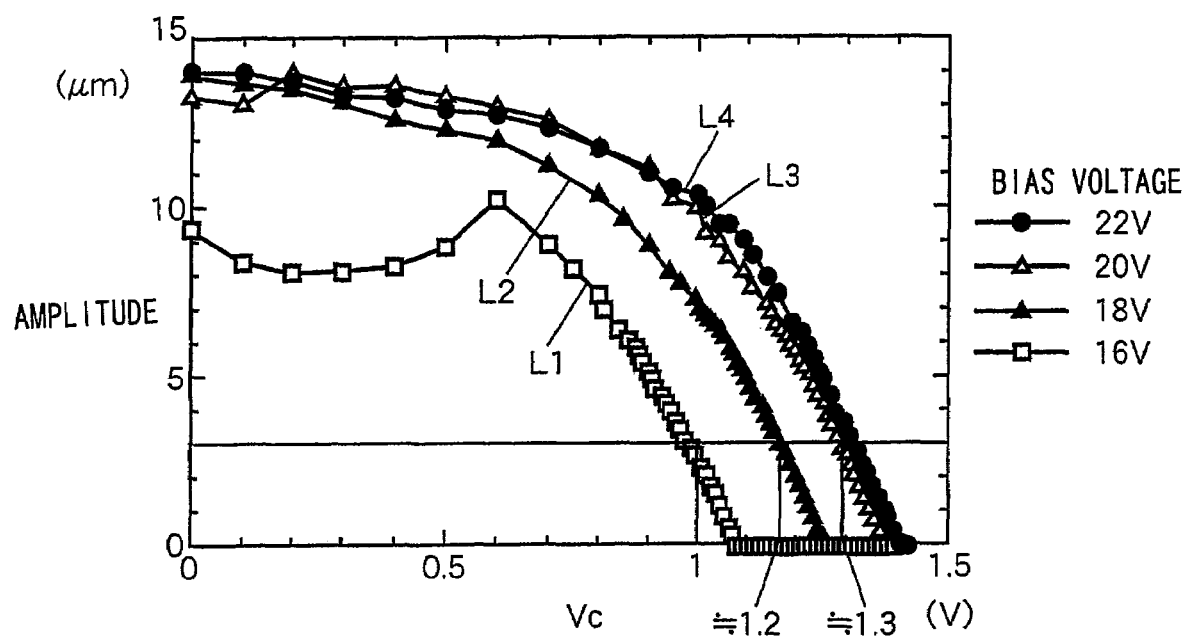
FIG. 9 presents measurement data obtained by measuring the amplitudes of the arms 3A and 3B as the open/close voltage and the gain control voltage $V_C$ were altered.

FIG. 9 presents a chart in reference to which the AGC function is to be explained. The chart provides data indicating the amplitude of the movable arm 20 measured on a laser Doppler vibration meter as the arm opening/closing voltage $E_0$ and the gain control voltage $V_c$ were altered. The amplitude is indicated along the vertical axis and the gain control voltage $V_c$ is indicated along the horizontal axis, with curves L1~L4 representing the measurement data obtained in correspondence to four different opening/closing voltage settings, 16V, 1V, 20V and 22V respectively. For instance, when the AGC function was not engaged with the gain control voltage $V_c$ fixed at 1V and the opening/closing voltage was set to 16V, the movable arm 20 vibrated with an amplitude of approximately 3 μm and, as the opening/closing voltage was increased to 18V and the movable arm 20 was closed, the vibration amplitude increased to approximately 7 μm.

This means that in order to sustain a constant amplitude regardless of whether the arm is opening or closing, the gain control voltage $V_c$ should be adjusted in synchronization with the change in the opening/closing voltage. For instance, an amplitude can be held at approximately 3 μm by changing the gain control voltage $V_c$ from 1V to 1.2V and then to 1.3V in synchronization with the change in the opening/closing voltage from 16V to 18V and then to 20V during an arm closing operation.

Figure 10A:
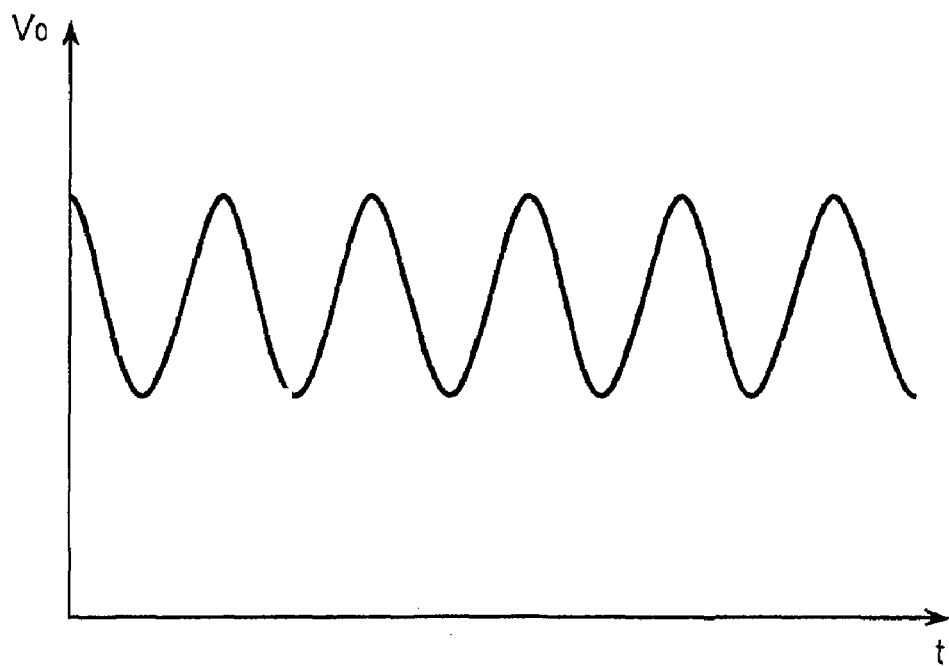
FIGS. 10A and 10B present an example of the output voltage $V_D$ that may be measured before and after contact occurs, with FIG. 10A showing the pre-contact signal and FIG. 10B showing the post-contact signal.
Figure 10B:
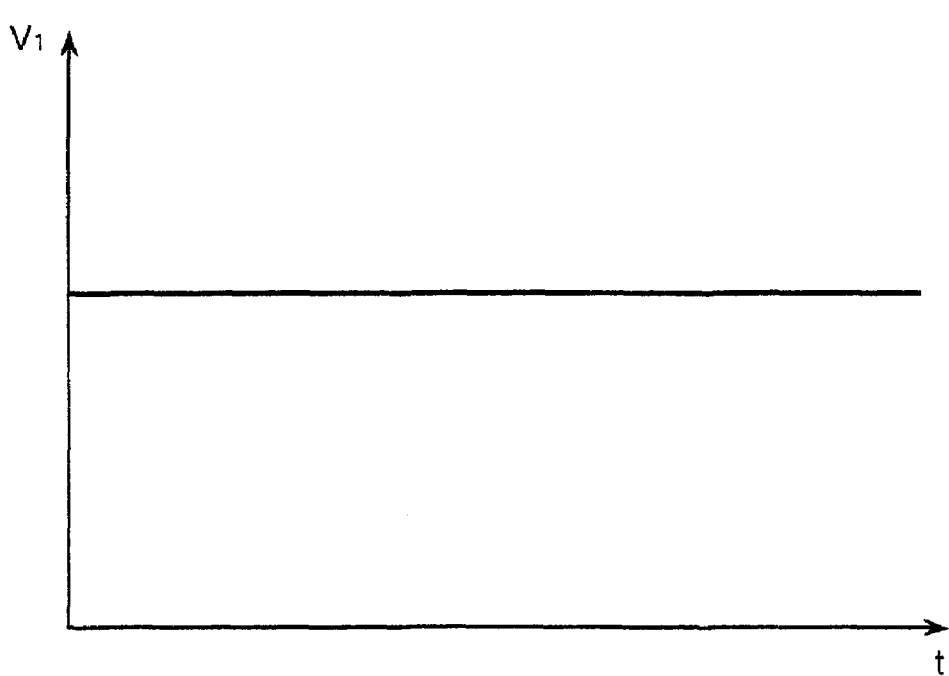

As the vibrating movable arm 20 contacts the specimen or another object, the movable arm 20 holds the specimen or the movable arm closes until the movable arm 20 and the fixed arm 10 are in contact with each other, the R, the C and the L in the equivalent circuit change, resulting in changes in the amplitude and frequency of the vibration. Such changes are detected by the contact/hold detection circuit 93. The output voltage $V_0$ may shift from the state shown in FIG. 10A to the state shown in FIG. 10B as the movable arm contacts an object. The output voltage $V_0$ is converted to a DC signal and the level of the DC signal is compared with a reference value. When the DC signal value is equal to or less than the reference value, the movable arm is judged to have entered the contact state or the hold state.

In addition, once the movable arm 20 contacts the specimen or holds the specimen, the AGC circuit 95 engages in operation so as to hold the amplitude of the movable arm 20 at a predetermined value, resulting in a change in the gain control voltage $V_c$ supplied to the control terminal at the amplifier 91. Accordingly, a change in the state of the vibration may be detected based upon a change in the gain control voltage $V_c$ supplied to the amplifier 91 and contact may be detected based upon the change in the vibration thus detected. Since the change in the gain control voltage $V_c$ is detected ahead of the changes in the amplitude and frequency, contact detection with better response is assured.

With the drive circuit unit 9 and the contact/hold detection circuit 93 shown in FIG. 7, the state of the contact/hold at the comb drive is detected by detecting the vibration amplitude. Instead, the state of contact/hold at the comb drive may be detected through frequency detection or through phase detection. The following is an explanation of a contact/hold detection circuit equipped with a frequency detection system and a contact/hold detection circuit equipped with a phase detection system.

Figure 11:
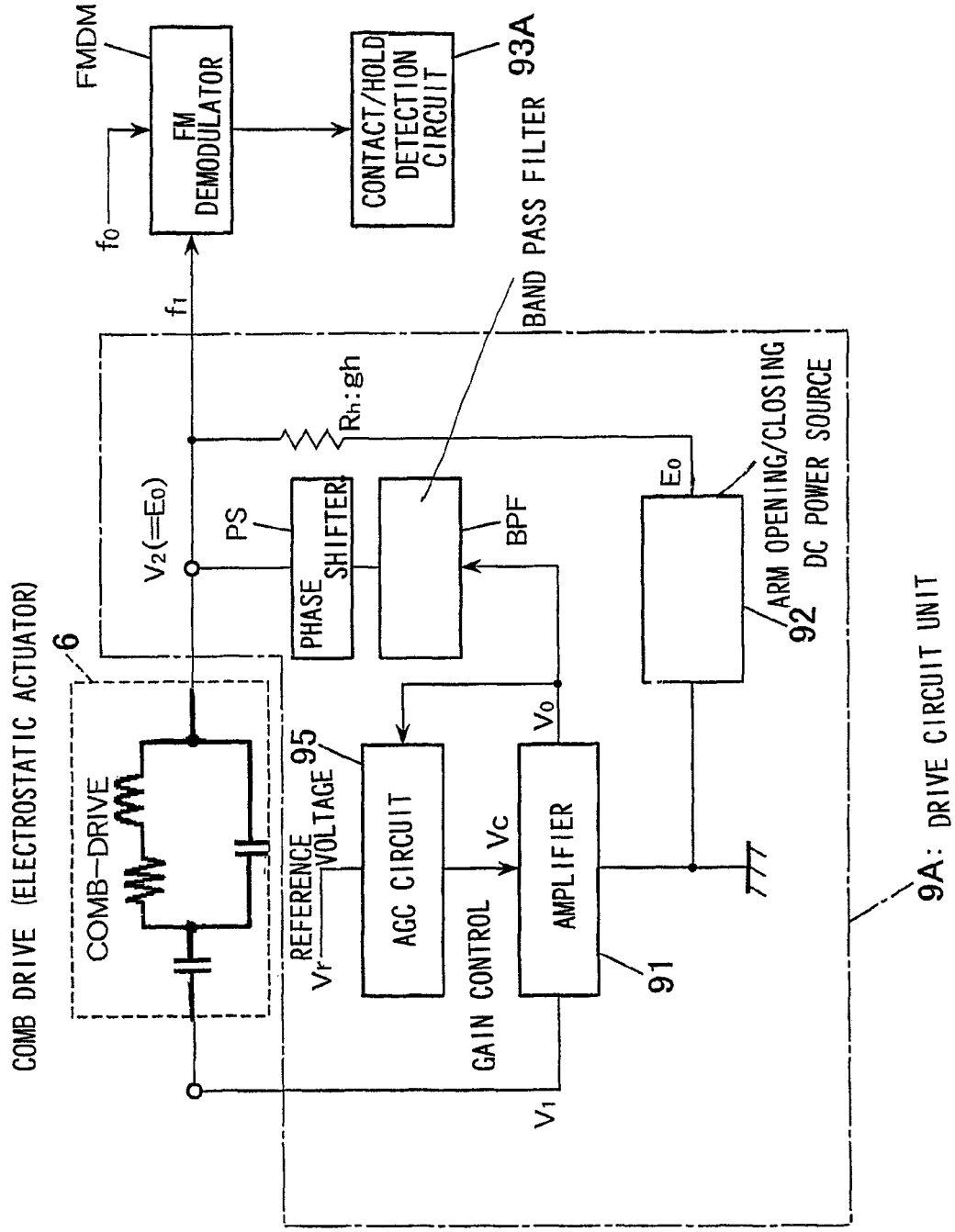
FIG. 11 shows a contact/hold detection circuit equipped with an oscillation frequency detection system.

FIG. 11 shows a contact/hold detection circuit equipped with an oscillation frequency detection system. In the figure, the same reference numerals are assigned to components similar to those in FIG. 7. The contact/hold detection circuit in the figure differs from that in FIG. 7 in that it includes a band pass filter BPF and a phase shifter PS disposed in the positive feedback path of the amplifier 91. The oscillation frequency can be fine-adjusted through adjustment of the phase shifter PS. An FM demodulator FMDM detects the extent of frequency shift relative to a reference frequency $f_0$ and outputs a frequency deviation signal. This frequency deviation signal is input to the contact/hold detection circuit 93A and the state of contact with/hold on the specimen is detected based upon the results of decision-making executed by a threshold value circuit (not shown).

Figure 12:
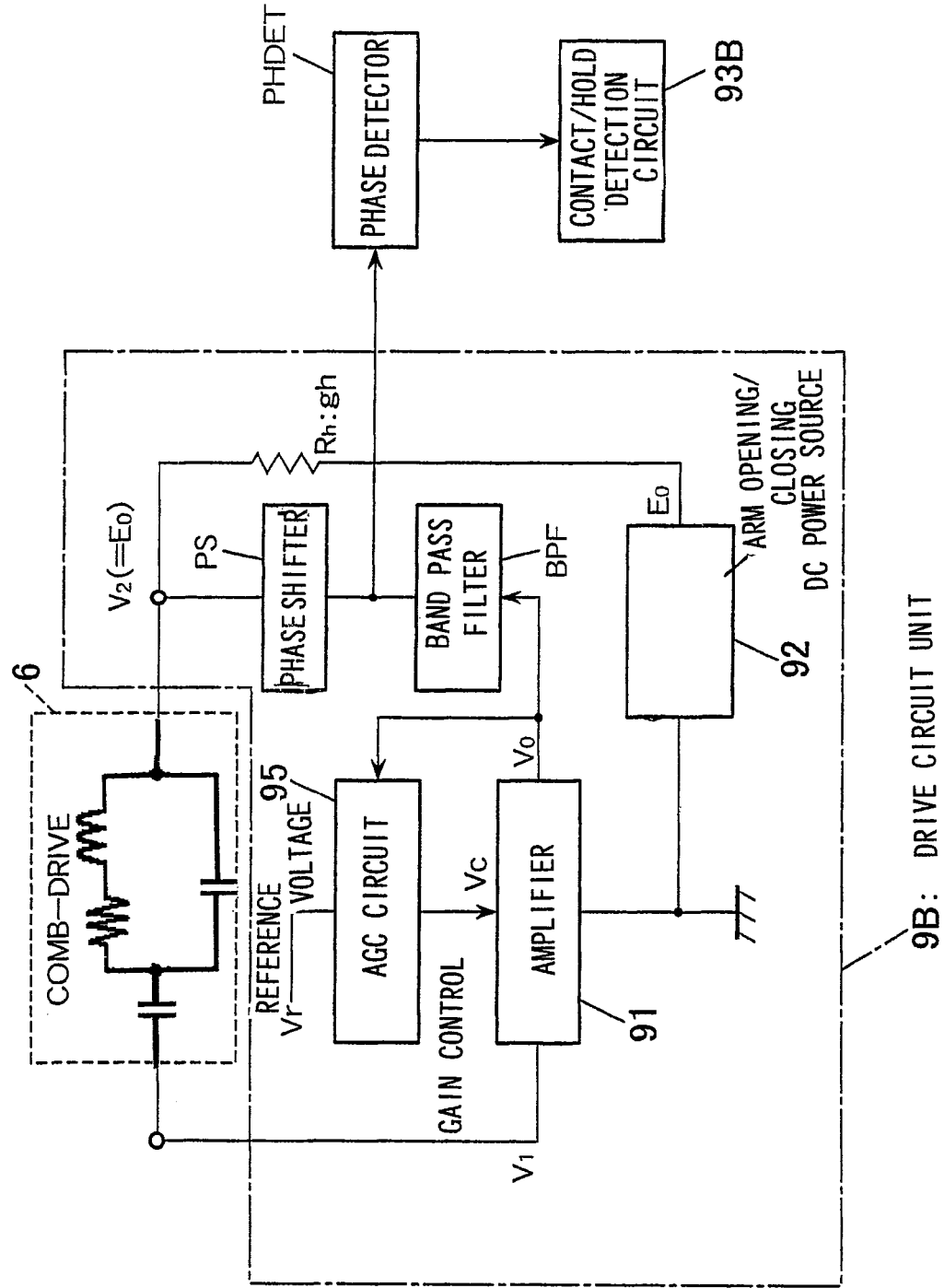
FIG. 12 shows a contact/hold detection circuit equipped with a phase detection system.

FIG. 12 shows a contact/hold detection circuit equipped with a phase detection system. In the figure, the same reference numerals are assigned to components similar to those in FIG. 7. The contact/hold detection circuit in the figure includes a band pass filter BPF and a phase shifter PS disposed in the positive feedback path of the amplifier 91, as does the contact/hold detection circuit in FIG. 11. The oscillation frequency can be fine-adjusted through adjustment of the phase shifter PS. The contact/hold detection circuit in the figure includes a phase detector PHDET and the extent of phase shift relative to 0 phase assuming any pre-adjusted phase (a phase in the free state) is converted to a voltage. The signal output from the phase detector PHDET is input to the contact/hold detection circuit 93B and the state of contact with/hold on the specimen is detected based upon the results of decision-making executed by a threshold value circuit (not shown).

(Specimen Transfer Operation)

While the AFM observation operation and the holding operation are described separately in the explanation of the operations provided above, the specimen is, in fact, transferred by executing both the AFM observation and the holding operation. FIGS. 13A through 13C and FIG. 14A through 14D illustrate an operational sequence of the specimen transfer operation. It is to be noted that only the front end portion (the probing portion 10B and the holding portion 20B) of the AFM tweezers 1 are shown in the FIGS. 13A through 13C and FIG. 14A through 14D.

Figure 13A:
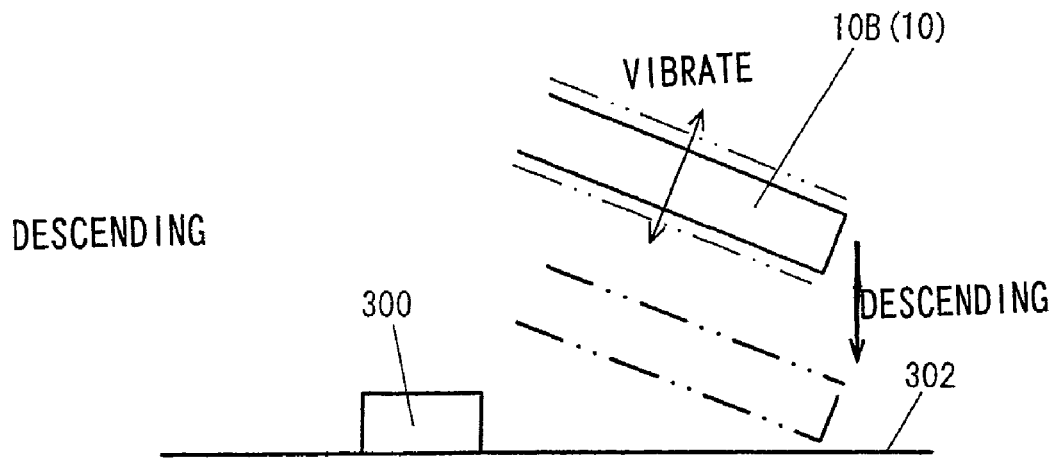
FIGS. 13A through 13C each illustrate the specimen transfer operation, with FIG. 13A showing a descending operation, FIG. 13B showing a scanning operation and FIG. 13C showing a displacement operation.

First, the movable arm 20 is set in an open state with no arm opening/closing voltage applied thereto and also, the exciter unit 5 is driven so as to excite the fixed arm 10 to vibrate. Then, as shown in FIG. 13A, the AFM tweezers 1 are caused to descend while the fixed arm 10 vibrates. Upon detecting a stage 302 on which a specimen 300 is placed, the descending motion of the AFM tweezers 1 is stopped.

Figure 13B:
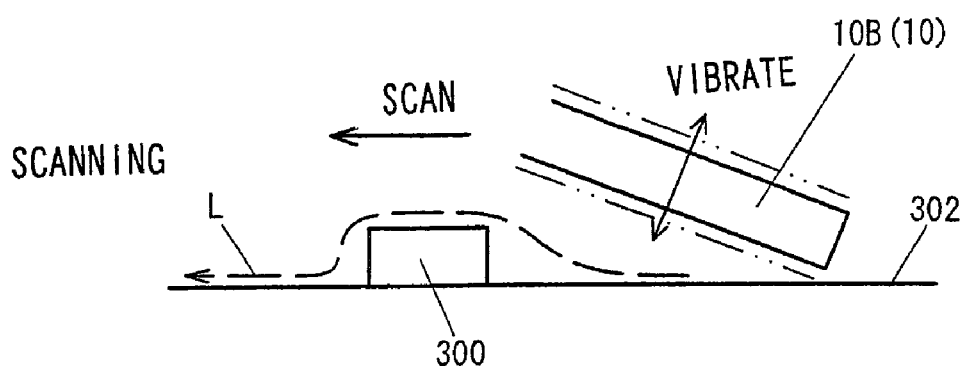

Subsequently, the stage 302 is scanned with the fixed arm 10, as shown in FIG. 13B, to locate the specimen 300. Namely, the stage 302 is scanned through AFM observation. As indicated by the dotted line L representing the locus of the front end of the probing portion 10B, the contour of the specimen 300 is observed through scanning and the position of the specimen 300 can thus be detected.

Figure 13C:
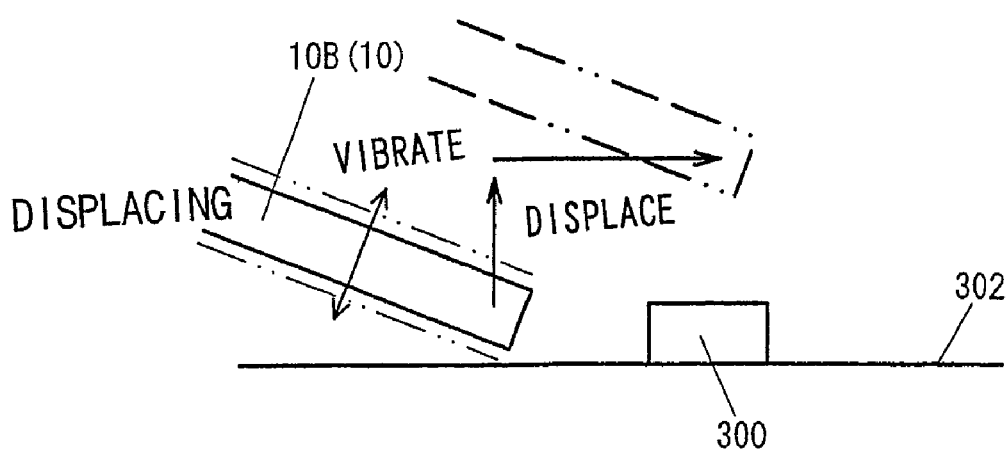
Figure 14A:
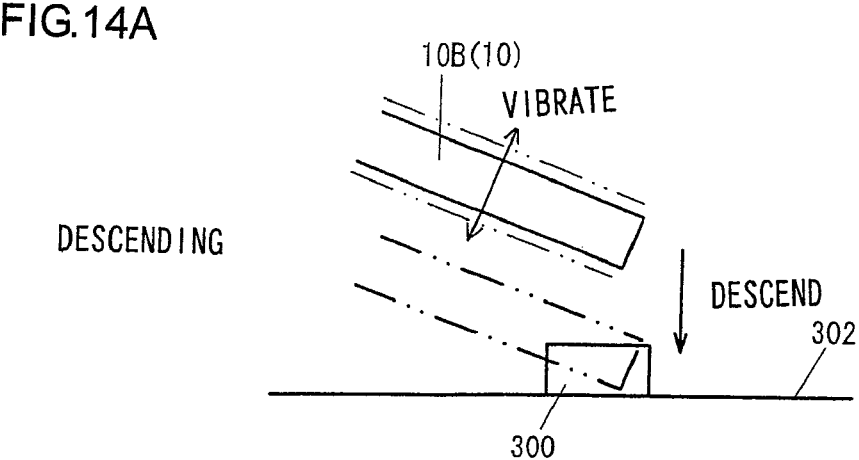
FIGS. 14A through 14D each illustrate the specimen transfer operation, with FIG. 14A showing a descending operation, FIG. 14B showing a closing drive operation, FIG. 14C illustrating a holding operation and FIG. 14D showing a transfer operation.

Upon detecting the position of the specimen 300 by scanning the stage with the fixed arm 10, the AFM tweezers 1 are moved upward away from the stage 302 and then, the probing portion 10B and the holding portion 20B are moved to a position above the specimen 300, as shown in FIG. 13C. At this time, the probing portion 10B and the holding portion 20B are made to move so as to position the specimen 300 between the probing portion 10B and the holding portion 20B. After the probing portion 10B and the holding portion 20B are moved to the position above the specimen 300, the AFM tweezers 1 are made to move downward until the stage 302 is detected, as shown in FIG. 14A. Once the stage 302 is detected, the descending motion stops.

Figure 14B:
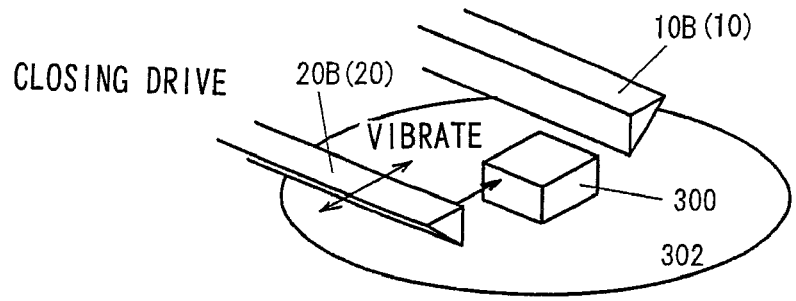

Subsequently, the exciter unit 5 is turned off to stop the vibration of the fixed arm 10 and the arm opening/closing voltage is applied. In response to the application of the arm opening/closing voltage, the electrostatic actuator 6 oscillates, causing the movable arm 20 to vibrate along the opening/closing direction as shown in FIG. 14B. Then, the arm opening/closing voltage is raised to drive the movable arm 20 along the closing direction.

Figure 14C:
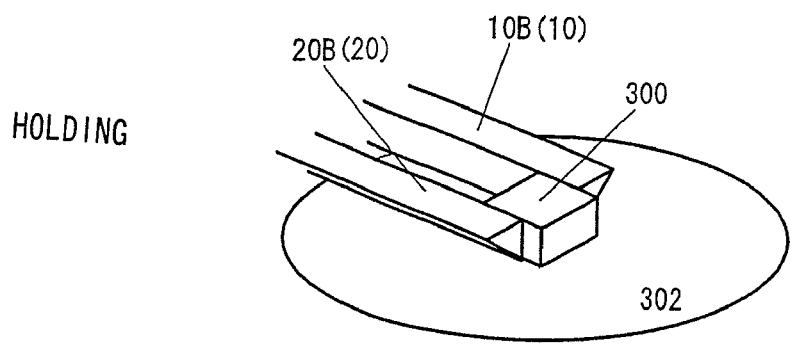
Figure 14D:
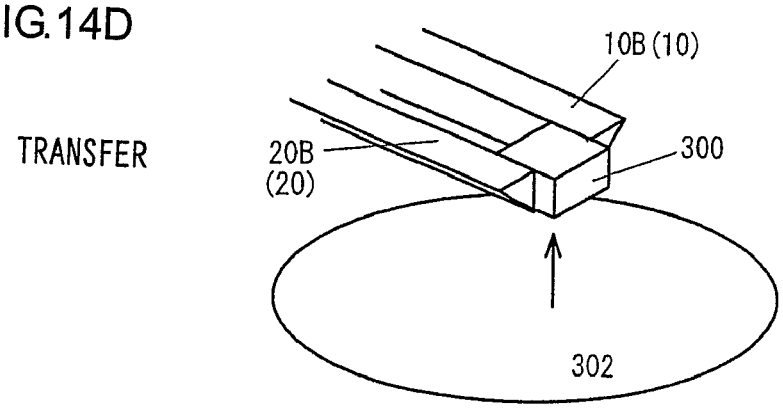

As the holding portion 20B contacts the specimen 300, the contact is detected based upon the change in the amplitude occurring at the time of the contact. Then, as the specimen 300 becomes held between the probing portion 10B and the holding portion 20B, the movement of the holding portion 20B is restricted and the amplitude becomes smaller until the vibration of the movable arm 20 stops, as shown in FIG. 14C. Upon detecting the vibration stop, i.e., upon detecting a hold, the increase in the arm opening/closing voltage is stopped and the arm opening/closing voltage is held at the level at which the hold has been detected. Subsequently, the three-dimensional stage 8 is driven so as to displace the AFM tweezers 1 holding the specimen 300, as shown in FIG. 14D, and the specimen 300 is thus transferred to a desired position.

(Manufacturing Method)

Next, a method that may be adopted when manufacturing the AFM tweezers 1 shown in FIG. 1 is described. The AFM tweezers 1 are formed as an integrated unit by using an SOI (silicon on insulator) wafer. As described in detail later, the support member 25 assumes a layered structure that includes an upper Si layer, an $SiO_2$ layer and a lower Si layer constituting the SOI wafer. The fixed arm 10, the movable arm 20 and the electrostatic actuator 6 are formed at the upper Si layer. While an SOI wafer constituted with an upper Si layer, an $SiO_2$ layer and a lower Si layer with the thicknesses thereof respectively set to 6 μm, 1 μm and 300 μm is used in the embodiment, the present invention is by no means limited to this dimensional combination.

FIGS. 15A through 21 illustrate the manufacturing steps through which the AFM tweezers 1 in the embodiment are manufactured by executing steps a through g in sequence. FIGS. 15A and 15B illustrate step a, with FIG. 15A presenting a perspective and FIG. 15B presenting a sectional view. In step a, a silicon nitride film 34 with a 15 nm thickness is formed on an upper Si layer 31 of an SOI wafer 30 constituted with the upper Si layer 31, an $SiO_2$ layer 32 and a lower Si layer 33. It is to be noted that the upper Si layer 31 of the SOI wafer 30 is formed so that the single crystal Si(001) principal plane is set at its front surface.

Figure 16:
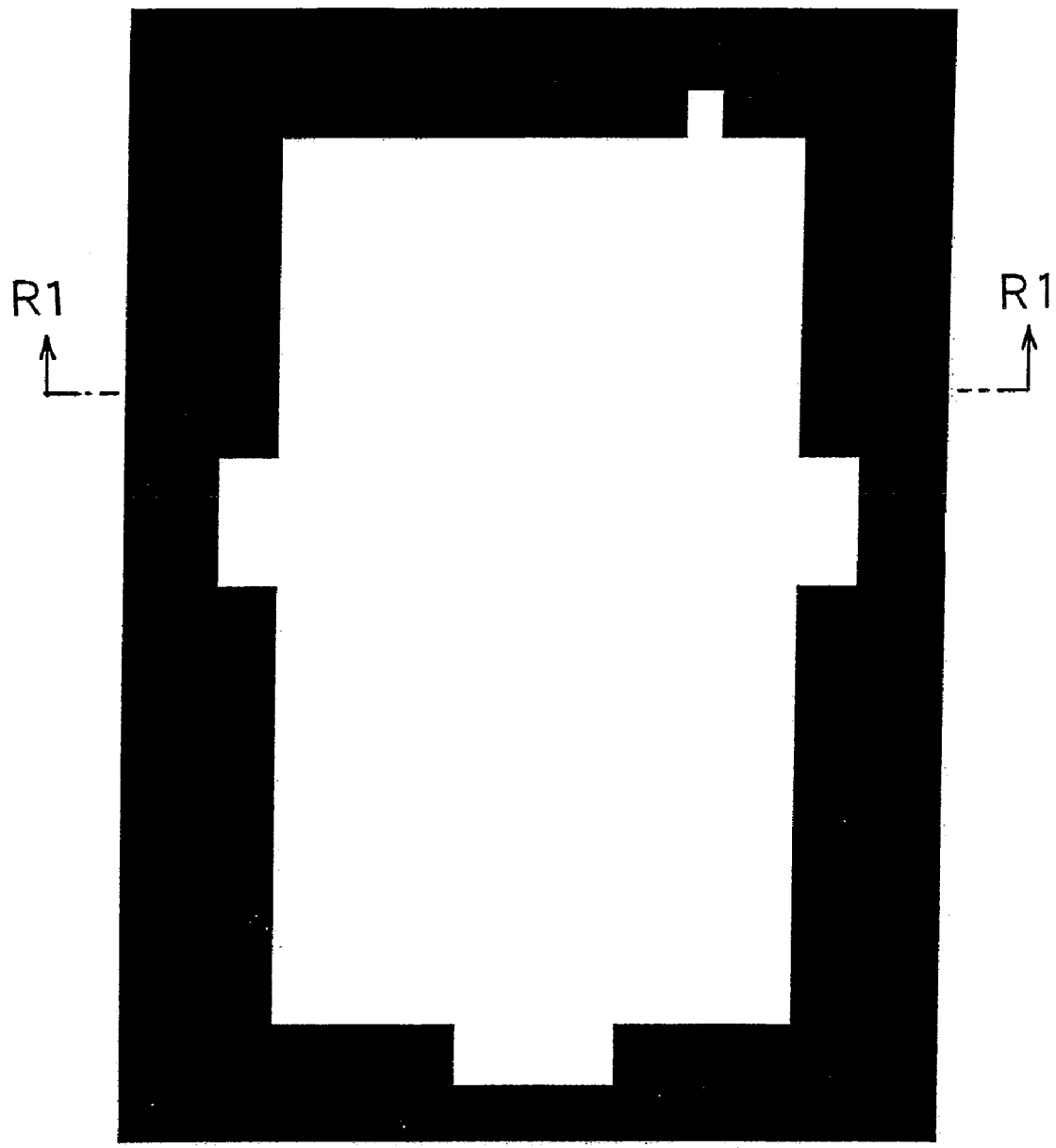
FIG. 16 shows the mask M1.

FIGS. 15C and 15D illustrate step b, with FIG. 15C presenting a perspective and FIG. 15D presenting a sectional view taken along R-R. In step b, a mask M1 such as that shown in FIG. 16 is utilized to partially etch and remove the SiN film 34 through RIE (reactive ion etching) executed by using $C_2F_6$, thereby exposing part of the upper Si layer 31 (over the unfilled area A1). The fixed arm 10, the movable arm 20 and the electrostatic actuator 6 are to be formed over the area A1 from which the SiN film 34 has been removed through etching. The fixed arm 10 and the movable arm 20 are to be formed so that their front ends extend along the <110> direction of the upper Si layer 31.

It is to be noted that while the mask M1 in FIG. 16 ranges so as to include the area corresponding to the support member 25, the portion shown in FIG. 15C corresponds to the area further upward relative to line R1-R1 in FIG. 16. The following explanation relates to the area further upward relative to line R1-R1.

In step c shown in FIGS. 15E and 15F, an oxide film 35 with a thickness of 0.1 μm is formed over the surface of the upper Si layer 31 in the area A1. The oxidation is achieved by adopting a wet oxidation method (steam oxidation).

Figure 17A:
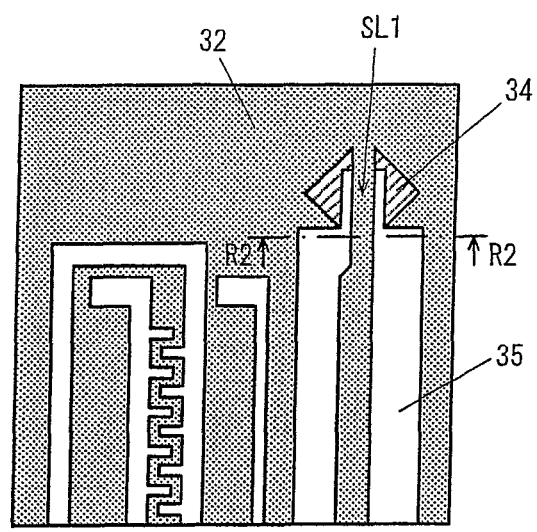
FIGS. 17A and 17B illustrate step d and FIGS. 17C through 17E illustrate step e.
Figure 17B:
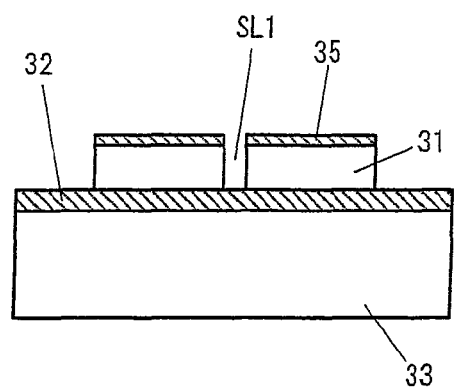
Figure 18:
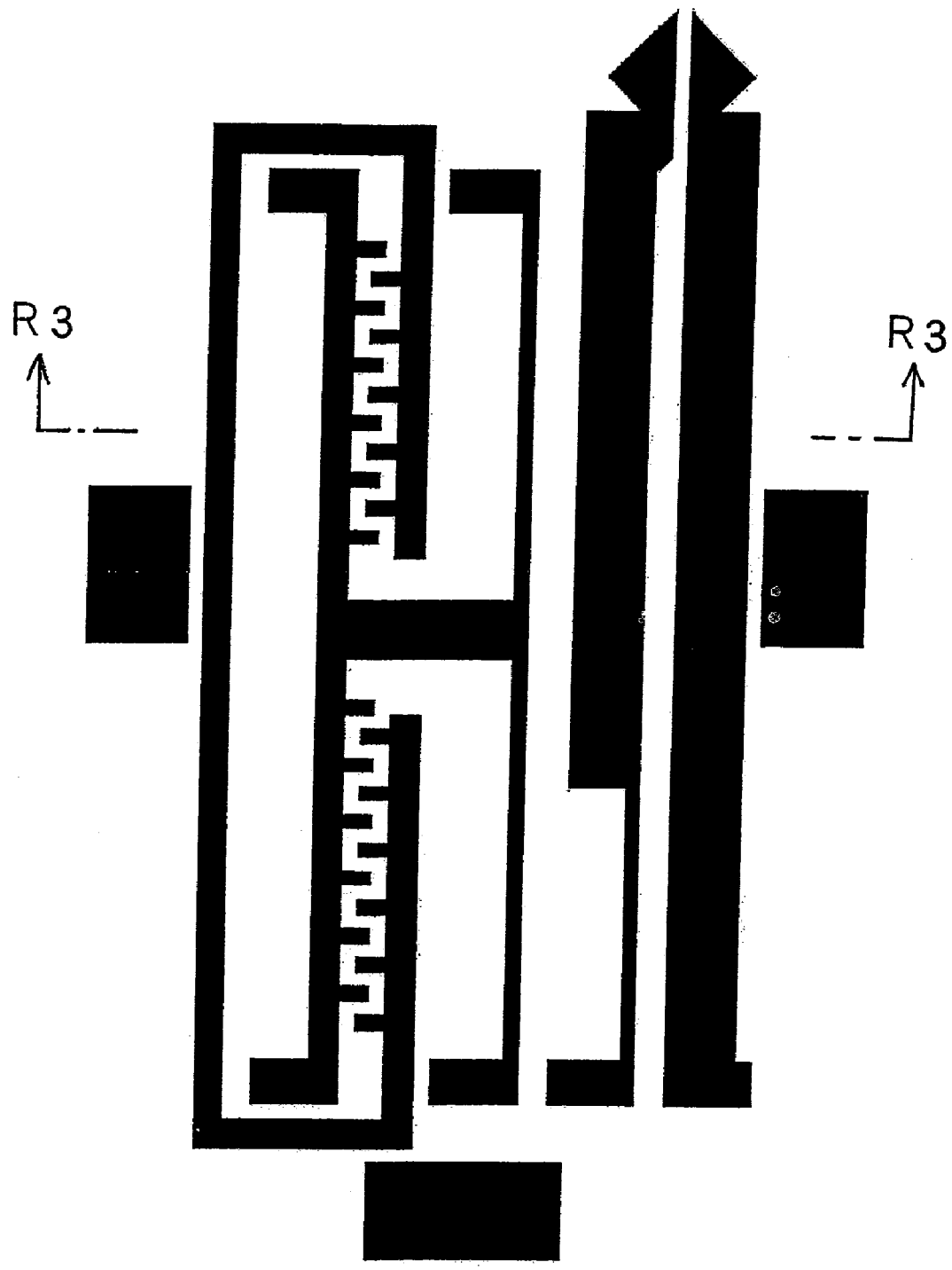
FIG. 18 shows the mask M2.

FIGS. 17A and 17B illustrate step d, with FIG. 17B presenting a sectional view taken along R2-R2 in FIG. 17A. In addition, the portion shown in FIG. 17A corresponds to an upper area of a mask M2 shown in FIG. 18, ranging further upward relative to line R3-R3. In step d, the mask M2 shown in FIG. 18 is utilized to pattern the outline of the AFM tweezers 1. It is to be noted that the comb shape, too, is formed through this step. Once the outline is patterned, the wafer is etched down to the $SiO_2$ layer 32 through ICP-RIE (inductively coupled plasma reactive ion etching). Through this etching process, a narrow slit SL1 (ranging along the <110> direction of the upper Si layer 31) is formed over the area where the front ends of the fixed arm 10 and the movable arm 20 are to be located. The slit SL1 is formed by vertically etching the substrate surface.

Figure 17C:
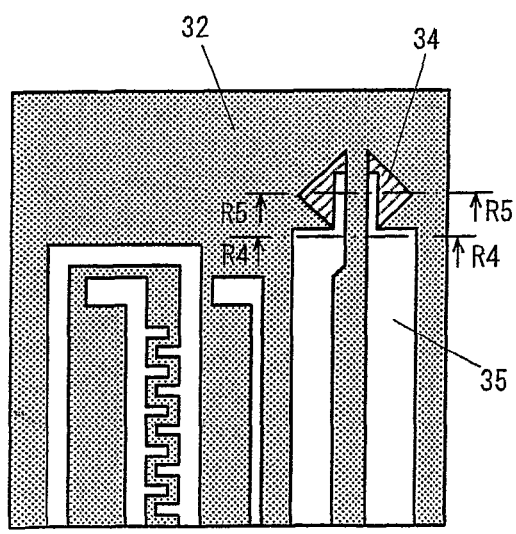
Figure 17D:
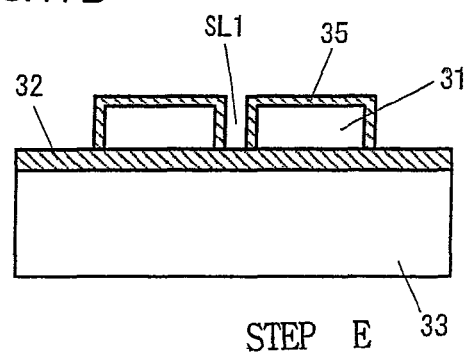
Figure 17E:
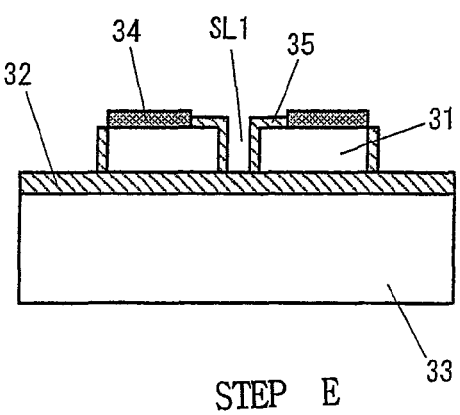
Figure 19A:
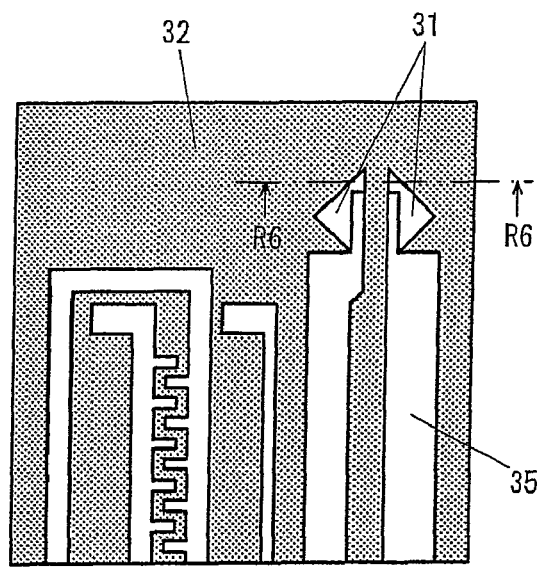
FIGS. 19A and 19B illustrate step f and FIGS. 19C and 19D illustrate step g.
Figure 19B:
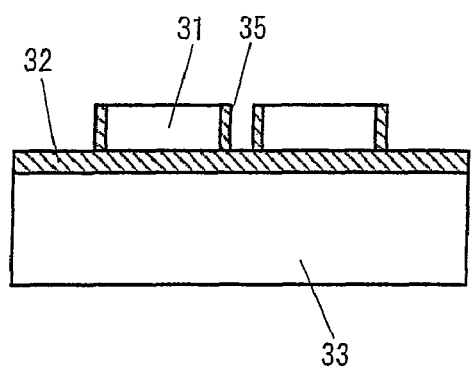

FIGS. 17C and 17D illustrate step e, with FIG. 517D presenting a sectional view taken along R4-R4 in FIG. 17C and FIG. 17E presenting a sectional view taken along R5-R5 in FIG. 17C. In step e, the exposed upper Si layer 31 is oxidized through wet oxidation. Subsequently, in step f illustrated in FIGS. 19A and 19B, the SiN film 34 is etched and removed through RIE by using $C_2F_6$, thereby exposing the upper Si layer 31 remaining under the SiN film 34. It is to be noted that FIG. 19B present a sectional view taken along R6-R6.

It is to be noted that the oxide film 35 formed through wet oxidation functions as a protective film for the upper Si layer 31 during the etching process. By selecting a high-pressure setting for the $C_2F_6$ gas as an RIE condition for the etching process, the selection ratio of the SiN film 34 and the oxide film 35 is adjusted so as to selectively remove the SiN film 34 alone, as shown in FIG. 19S. As a result, the oxide film 35, having been formed for purposes of protection, remains unetched, and the upper Si layer 31 under the SiN film 34 alone becomes exposed.

Figure 19C:
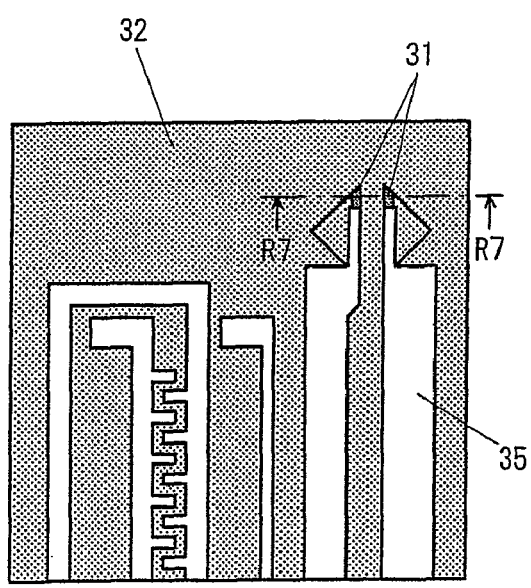
Figure 19D:
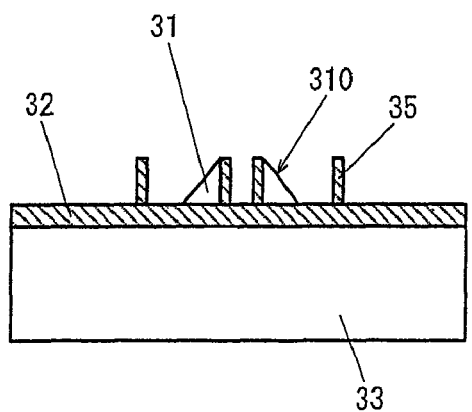
Figure 21:
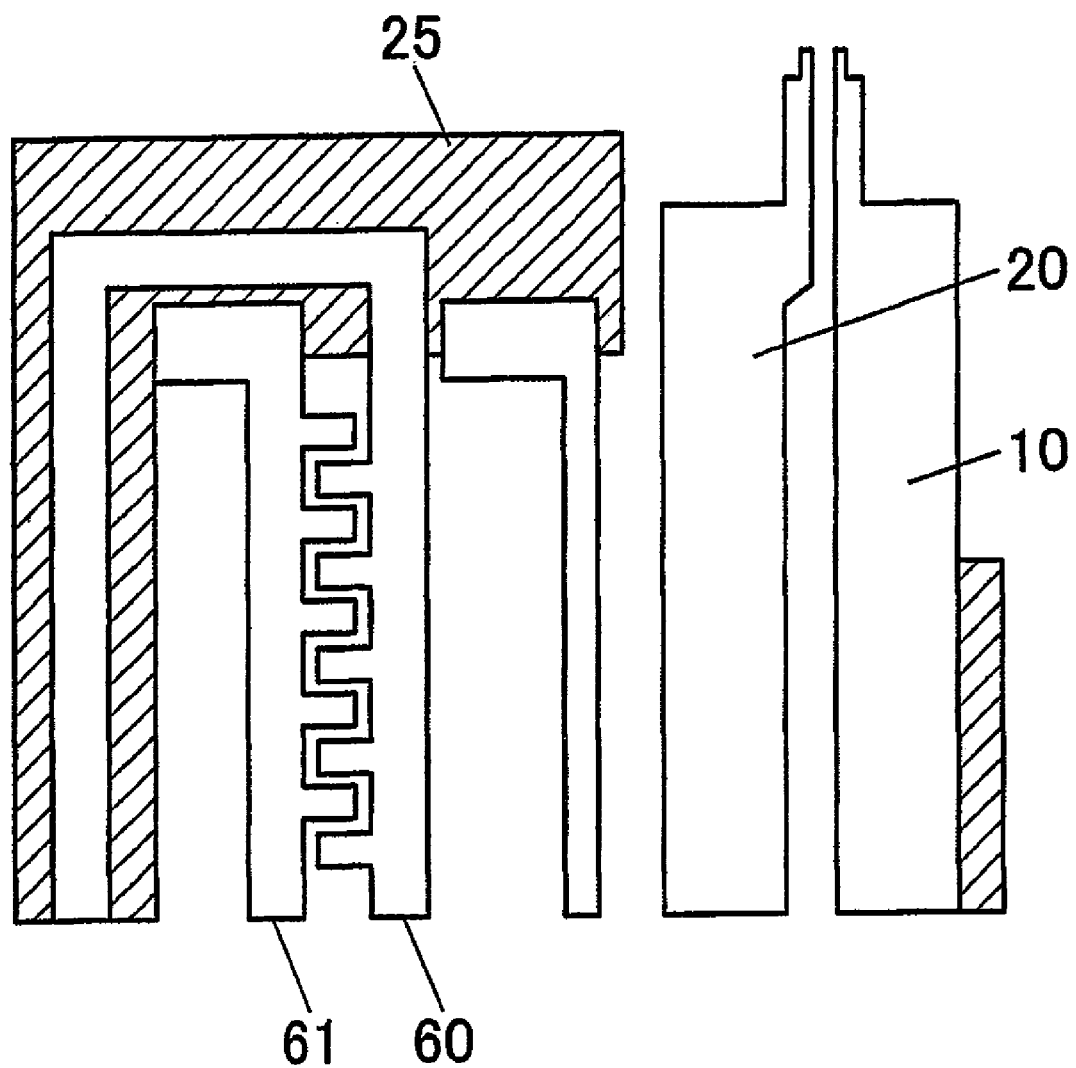
FIG. 21 shows the AFM tweezers 1 that are finally formed.

FIGS. 19C and 19D illustrate step g, with FIG. 19D presenting a sectional view taken along R7-R7. In step g, the exposed upper Si layer 31 is anisotropically etched by using a 30% KOH aqueous solution. The areas protected by the oxide film remain unetched and only the upper Si layer 31 is anisotropically etched, thereby forming inclined surfaces 310. As a result, portions to constitute the probing portion 10B and the holding portion 20B with triangular sections are formed. Since the single crystal Si(001) principal plane is set at the surface of the upper Si layer 31, as described earlier, the single crystal Si{111} plane is set over the inclined surfaces 310 formed through anisotropic etching.

Next, any superfluous portion is removed through an ICP-RIE process executed by using a mask M3 shown in FIG. 20A. The oxide film is then removed through etching. Through the etching process executed by using the mask M3, the lengths of the probing portion 10B and the holding portion 20B are adjusted. Lastly, a mask M4 in FIG. 20B is utilized to remove any superfluous portion present toward the lower Si layer 33 from the rear surface of the SOI wafer through ICP-RIE. This etching process should stop as the wafer is etched through the $SiO_2$ layer 32. Subsequently, the superfluous portion of the $SiO_2$ layer is removed by using a hydrofluoric acid solution to form the electrostatically driven AFM tweezers 1 achieving the shape shown in FIG. 21 (viewed from the rear side).

While the manufacturing sequence through which a single set of AFM tweezers 1 is manufactured is explained above, the actual manufacturing process is executed through batch processing of individual SOI wafers. This batch processing, executed by adopting a photolithography technology, allows numerous sets of AFM tweezers 1 to be manufactured at once from a single SOI wafer, which achieves a great reduction in the manufacturing costs.

As explained above, a specimen or the like can be held between the fixed arm 10 and the movable arm 20 by driving the movable arm 20 of the AFM tweezers 1 along the opening/closing direction and also AFM observation is enabled by utilizing the fixed arm 10 in the first embodiment. In addition, a hold on an object by the AFM tweezers 1 can be detected by vibrating the movable arm 20 via the electrostatic actuator 6 and detecting the change occurring in the state of vibration of the movable arm 20 as it contacts the specimen (e.g., a change in the amplitude, a change in the frequency or a change in the phase).

Furthermore, as the AFM tweezers 1 are driven downward toward the stage for purposes of AFM observation, its proximity to the specimen or the stage or its contact with the specimen or the stage can be detected based upon the change in the state of vibration. Thus, since this makes it possible to ensure that the AFM tweezers are never allowed to move too low, damage to the arms can be prevented. Moreover, the AGC circuit 95 prevents destabilization in the vibration due to disturbance, and since this allows the vibration amplitude to be kept down, an improvement in the accuracy of contact detection or hold detection is assured.

In addition, by executing the AFM observation operation and the holding operation in combination, the detection of a minute specimen and the operation of holding the detected minute specimen and transferring it to the desired position can be performed at once, so as to achieve improved operational efficiency.

It is to be noted that while an explanation is given above on an example in which the AFM observation is executed through the use of the fixed arm 10 in the dynamic force mode, the present invention is not limited to this application and it may also be adopted in contact mode observation. In the latter case, the lower end of the fixed arm 10 should be set slightly lower than the position of the lower end of the movable arm 20 so as to facilitate the AFM observation via the fixed arm 10. Alternatively, the movable arm 20 may be connected to a lift mechanism assuming a bimorph structure so as to move the movable arm 20 away from the specimen by driving the bimorph when observing the specimen. Such a bimorph structure, too, can be formed through the process described above.

Second Embodiment

Figure 22:
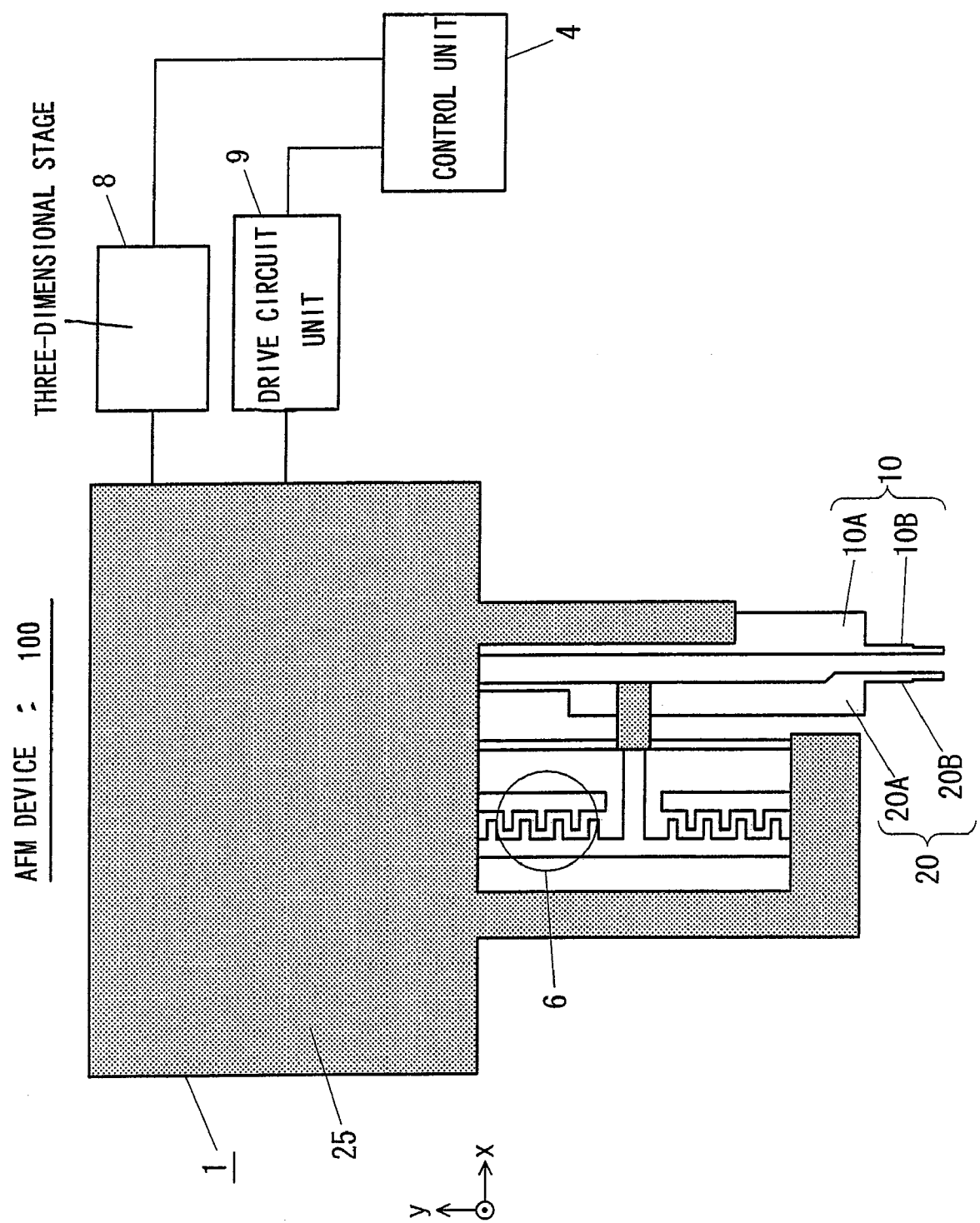
FIG. 22 shows a second embodiment of the tweezer-equipped scanning probe microscope according to the present invention.

FIG. 22 shows the second embodiment of the tweezer-equipped scanning probe microscope according to the present invention. In the first embodiment described above, the front end of the fixed arm 10 is used as a probing needle, the change in the state of vibration at the movable arm 20 (change in amplitude, frequency or phase) is detected via the optical lever system and the Z-servo system is manipulated for purposes of AFM observation based upon the detection signal. In the second embodiment, on the other hand, the AFM observation is enabled via the movable arm 20 caused to vibrate by the electrostatic actuator 6. For this reason, the scanning probe microscope in FIG. 22 does not require the optical lever system (the laser light source 2 and the photodiode 3) and the exciter unit 5 used for purposes of contour observation in the scanning probe microscope shown in FIG. 1. The essential structural features of the drive circuit unit engaged in operation to drive the comb drive (electrostatic actuator) 6 are similar to those in the first embodiment (see the drive circuit unit 9 in FIG. 7).

As explained earlier, the movable arm 20 is caused to resonate at its mechanical resonance frequency. The amplitude of this resonance is determined in correspondence to the Q value of the electrostatic actuator 6, the spring constant of the spring at the electrostatic actuator 6 and the gain (exciting voltage) at the positive feedback system constituted with the amplifier 91 and the AGC circuit 95. The movable arm 20 is structured so that it vibrates along a direction (lateral direction) parallel to the specimen surface. Accordingly, the AGC circuit 95 must be adjusted to sustain the state of vibration with the smallest possible vibration amplitude (e.g., an amplitude of 0.1~100 nm) in order to assure the required level of AFM image resolution and the required level of detection sensitivity along the Z direction.

Figure 23:
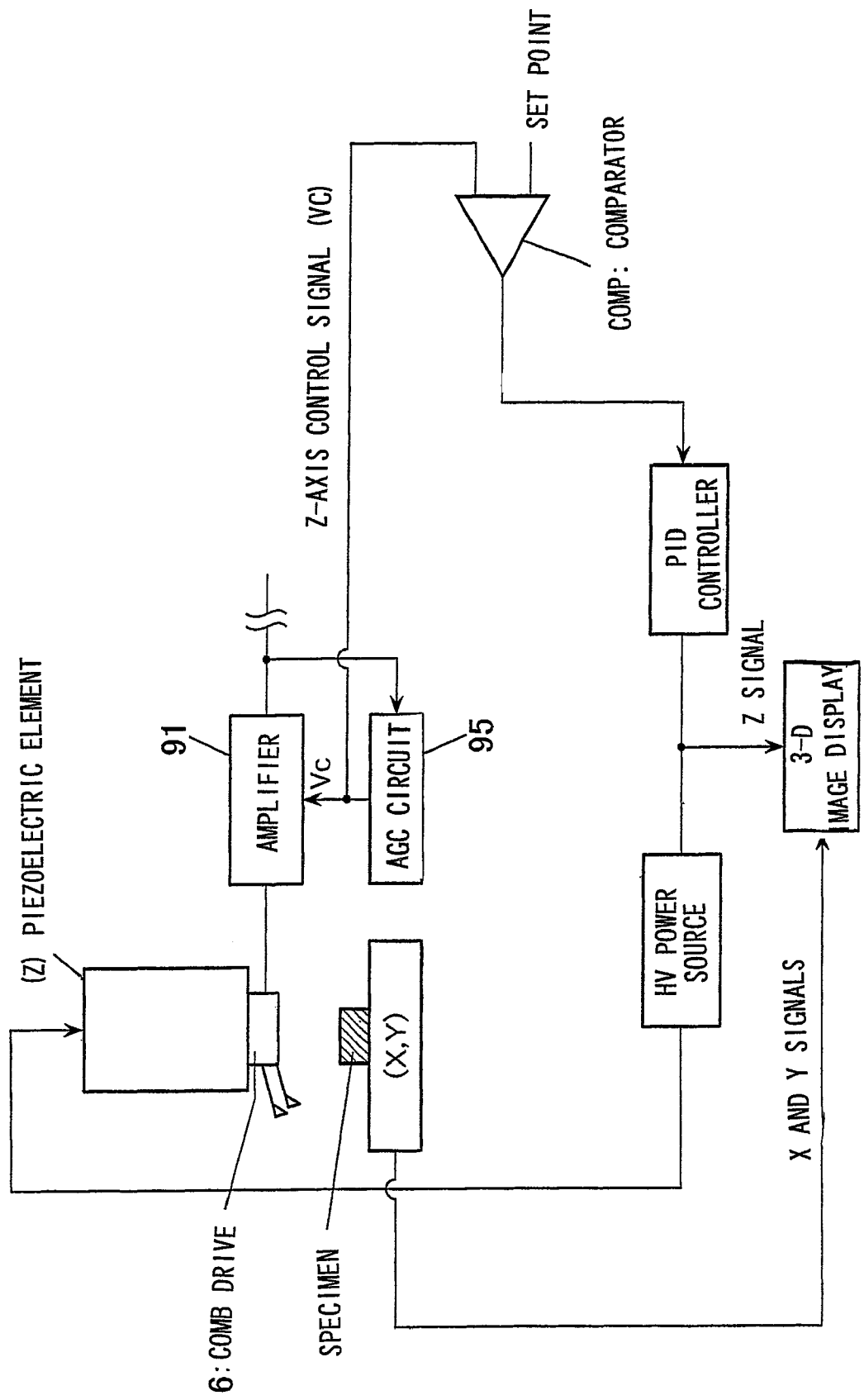
FIG. 23 schematically illustrates a structure that may be adopted to allow the control output $V_c$ output from the AGC circuit to be used as a Z-axis control signal when driving the piezoelectric element.

The Z servo control executed by using the control output $V_c$ from the AGC circuit 95 in FIG. 7 is now described. FIG. 23 schematically illustrates a structure that may be adopted when driving the piezoelectric element based upon the control output $V_c$ used as a z-axis control signal. Namely, in order to compare the z-axis control signal with a predetermined set point value, the z-axis control signal ($V_c$) is input to a comparator COMP. Then, the piezoelectric element is driven via a PID controller and a high-voltage power source. The piezoelectric element engages in an operation equivalent to that of the Z stage in the three-dimensional stage in FIG. 22. It is to be noted that since a method that may be adopted to display an image based upon the Z signal, the X signal and the Y signal does not bear direct relevance to the present invention, a detailed explanation is not provided.

As the vibrating movable arm 20 moves close to the specimen surface, the amplitude of the lateral vibration of the movable arm 20 becomes attenuated due to the lateral interactive force (shear force) manifesting between the specimen and the front end of the movable arm 20. The distance between the probing needle and the specimen is controlled by controlling the Z servo system shown in FIG. 23 so as to maintain the extent of lateral vibration amplitude attenuation at a constant level. Based upon the control signal used in this distance control and an XY stage scanning signal (not described in detail), the three-dimensional contour signal indicating the three-dimensional contour of the specimen is obtained. In addition, if an electrostatic comb actuator with a low level of mechanical rigidity is utilized, the movable arm may also be operated in an electrostatic comb actuator higher-order resonance mode.

While the extent of change in the amplitude is detected in the structure achieved in the second embodiment as explained earlier, a change also occurs in the frequency or the phase of the lateral vibration as the second arm moves closer to the specimen surface. The contour of the specimen may be determined in a similar manner by detecting the extent of such a change, converting it to a voltage and operating the Z servo system so as to sustain the extent of the change at a constant value.

Figure 24:
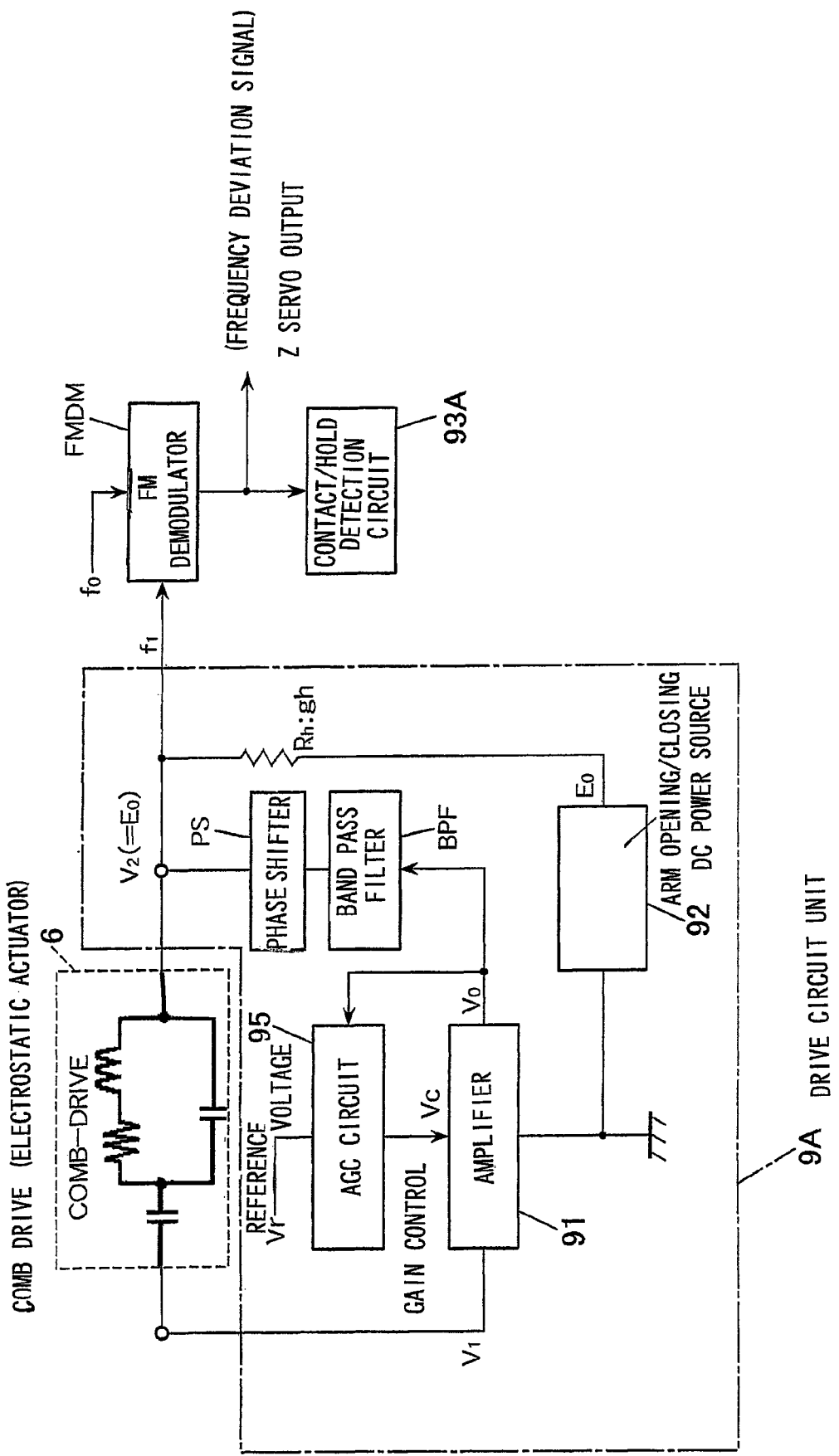
FIG. 24 shows a circuit structure that may be adopted in order to obtain a Z servo output by assuming a specific circuit structure in the frequency detection system.

FIG. 24 is a circuit diagram showing a circuit structure that may be adopted to obtain a Z servo output by assuming a specific circuit structure in the frequency detection system. Since the circuit structure in the figure is similar to that in FIG. 11 in reference to which an explanation has already been given, a detailed explanation is omitted. In this example, the frequency deviation signal output from the FM demodulator FMDM is used as the Z servo output. Based upon the Z servo output, a Z data signal is generated.

Figure 25:
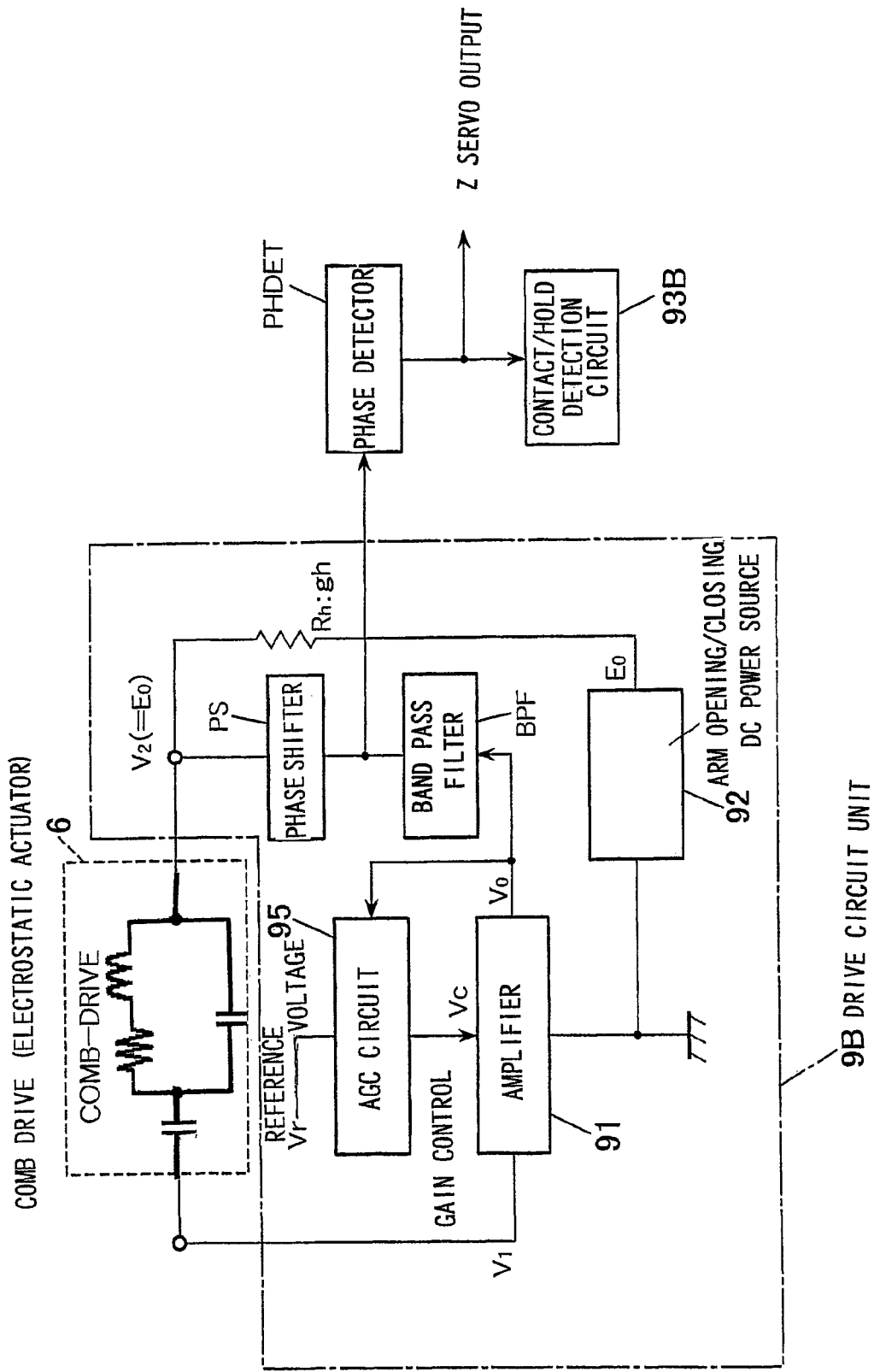
FIG. 25 shows a circuit structure that may be adopted in order to obtain a Z servo output by assuming a specific circuit structure in the phase detection system.

FIG. 25 is a circuit diagram showing a circuit structure that may be adopted to obtain a Z servo output by assuming a specific circuit structure in the phase detection system. Since the circuit structure in the figure is similar to that in FIG. 12 in reference to which an explanation has already been given, a detailed explanation is omitted. In this example, the phase shift quantity signal output from the phase detector PHDET is used as the Z servo output. Based upon the Z servo output, a Z data signal is generated.

In the second embodiment described above, the movable arm 20 is made to resonate and the change occurring in the state of the vibration of the movable arm is detected in AFM observation. As a result, the optical lever system and the exciter unit 5 (the laser 2 and the photodiode 3) in FIG. 1 are no longer required in the microscope device, thereby achieving a simplification in the device structure and a cost reduction. In addition, the extent to which the vibration amplitude changes due to disturbance is reduced by executing gain adjustment via the AGC circuit 95, which makes it possible to sustain the state of vibration regardless of any change that may occur in the environment. It is to be noted that advantages similar to those of the first embodiment explained earlier are achieved with regard to the specimen contact detection and the specimen hold detection executed based upon the change in the state of vibration.

While an electrostatic actuator is used as a detector in a scanning probing microscope in the related art disclosed in Japanese Patent Application Publication No. 2007-93231 or "The Displacement Measurement Device Using a Comb Drive Actuator" mentioned earlier, neither of the scanning probe microscopes disclosed in these publications has an AGC function comparable to that in the second embodiment. An electrostatic actuator, which is minuscule in size, tends to be readily affected by a disturbance such as an air current. This means that it is difficult to allow the probe to vibrate with a high level of sensitivity over a constant minute amplitude. These issues are effectively addressed in the embodiment that includes the AGC circuit 95.

It is to be noted that while the movable arm 20 of the AFM tweezers 1 is utilized in AFM observations in the second embodiment described above, an AFM probe such as that described in "The Displacement Measurement Device Using a Comb Drive Actuator" may be caused to vibrate via the electrostatic actuator 6 in a structure that includes an AGC circuit similar to that in the embodiment, so as to operate the Z servo system to ensure that the extent of change in the vibration amplitude, in the frequency or in the phase is sustained at a constant level. While this structure does not provide a holding function, advantages similar to those of the second embodiment are achieved with regard to the AFM observation.

While the AFM tweezers 1 in the embodiments described above are formed by processing a silicon substrate, the AFM tweezers 1 may be formed through any of various forming methods other than that described earlier. It is to be noted that the embodiments described above simply represent examples and the present invention is not restricted in any way whatsoever by the embodiments as long as the features characterizing the present invention are not compromised.

What is claimed is:

1. A tweezer-equipped scanning probe microscope, comprising:
   a first arm with a probing portion;
   a second arm that moves along an opening direction or a closing direction relative to the first arm;
   an electrostatic actuator that drives the second arm along the opening direction or the closing direction based upon an opening/closing drive voltage applied thereto;
   an amplifier that induces self-oscillation in the electrostatic actuator by using an electrically equivalent circuit accompanying the electrostatic actuator as a feedback circuit and causes the second arm to vibrate through the self-oscillation; and
   a vibration state detection unit that detects a change of vibration state of the second arm as the second arm contacts an object.

2. A tweezer-equipped scanning probe microscope according to claim 1, further comprising:
   a gain adjustment unit that adjusts a gain at the amplifier so as to sustain a vibration amplitude at the second arm caused to vibrate through the self-oscillation at a constant level in a non-contact state.

3. A tweezer-equipped scanning probe microscope according to claim 1, further comprising:
   a hold detection unit that detects a hold on a specimen by the first arm and the second arm based upon the change of vibration state detected by the vibration state detection unit.

4. A tweezer-equipped scanning probe microscope according to claim 1, wherein:
   the vibration state detection unit detects the change of vibration state by detecting at least one of; a change in amplitude of resonance, a change in frequency or a change in phase, which occur as the second arm contacts the object.

5. A tweezer-equipped scanning probe microscope according to claim 1, wherein;
   the electrostatic actuator includes a stationary comb electrode unit and a movable comb electrode unit that is linked to the second arm and drives the second arm.

6. A tweezer-equipped scanning probe microscope according to claim 1, further comprising:
   a scanning unit that scans the probing portion over an observation target;
   a detection unit that detects a change of vibration state of the first arm related to an interaction between the probing portion and the observation target; and
   a Z servo system that controls a distance between the probing portion and a specimen so as to sustain an extent of the change of vibration state at a constant level, wherein:
   a contour and a position of the observation target are measured based upon the distance between the probing portion and the observation target.

7. A tweezer-equipped scanning probe microscope according to claim 6, further comprising:
   an exciting unit that causes the first arm to vibrate with flexural elasticity toward the observation target through natural vibration thereof.

8. A tweezer-equipped scanning probe microscope, comprising:
   a first arm;
   a second arm with a probing portion that moves along an opening direction or a closing direction relative to the first arm;
   an electrostatic actuator that drives the second arm along the opening direction or the closing direction based upon an opening/closing drive voltage applied thereto;
   an amplifier that induces self-oscillation in the electrostatic actuator by using an electrically equivalent circuit accompanying the electrostatic actuator as a feedback circuit and causes the second arm to vibrate through the self-oscillation;
   a gain adjustment unit that adjusts a gain at the amplifier when the electrostatic actuator is self-oscillating;
   a vibration state detection unit that detects a change of vibration state of the second arm as the second arm contacts an object; and
   a scanning unit that scans the probing portion over an observation target, wherein:
   the second arm vibrating through the self-oscillation is moved in close proximity to the observation target; and
   contour information indicating a contour of a surface of the observation target is obtained by the scanning unit while operating a Z servo system that controls a distance between the probing portion and a specimen so as to sustain an extent of the change of vibration state of the second arm related to interaction between the probing portion and the observation target at a constant level.

9. A tweezer-equipped scanning probe microscope according to claim 8, further comprising:

a hold detection unit that detects a hold on a specimen by the first arm and the second arm based upon the change of vibration state detected by the vibration state detection unit.

10. A tweezer-equipped scanning probe microscope according to claim 8, wherein:
the vibration state detection unit detects the change of vibration state by detecting at least one of; a change in amplitude of resonance, a change in frequency or a change in phase, which occur as the second arm contacts the object.

11. A specimen transfer method adopted in a tweezer-equipped scanning probe microscope according to claim 6, comprising:
determining a position of the specimen by scanning the specimen with the probing portion;
moving the first arm and the second arm to positions at which the specimen is set between the first arm and the second arm based upon the position of the specimen having been determined;
closing the second arm so as to hold the specimen between the first arm and the second arm; and
transferring the specimen by moving the first arm and the second arm holding the specimen therebetween.

12. A specimen transfer method adopted in a tweezer-equipped scanning probe microscope according to claim 8, comprising:
determining a position of the specimen by scanning the specimen with the probing portion;
moving the first arm and the second arm to positions at which the specimen is set between the first arm and the second arm based upon the position of the specimen having been determined;
closing the second arm so as to hold the specimen between the first arm and the second arm; and
transferring the specimen by moving the first arm and the second arm holding the specimen therebetween.

* * * * *